(12) United States Patent
Champlin et al.

(10) Patent No.: US 7,707,008 B1
(45) Date of Patent: *Apr. 27, 2010

(54) AUTOMATICALLY IDENTIFYING INCONGRUOUS ITEM PACKAGES

(75) Inventors: Cary R. Champlin, Issaquah, WA (US); Felix F. Anthony, Issaquah, WA (US); Mackenzie Smith, Issaquah, WA (US); Anthony B. Williams, Shoreline, WA (US); Alexander C. Prater, Seattle, WA (US); James E. Bacus, Seattle, WA (US); Suzanne C. Reynolds, Lexington, KY (US); Dean W. Webster, Seattle, WA (US)

(73) Assignee: Amazon Technologies, Inc., Incline Village, NV (US)

( * ) Notice: Subject to any disclaimer, the term of this patent is extended or adjusted under 35 U.S.C. 154(b) by 1000 days.

This patent is subject to a terminal disclaimer.

(21) Appl. No.: 11/445,927

(22) Filed: Jun. 1, 2006

Related U.S. Application Data

(63) Continuation of application No. 10/827,614, filed on Apr. 19, 2004, now Pat. No. 7,085,677.

(51) Int. Cl.
*G06F 11/30* (2006.01)
*G06F 7/00* (2006.01)

(52) U.S. Cl. .................. 702/182; 702/174; 700/115; 700/216

(58) Field of Classification Search ............. 702/182, 702/174, 173, 81, 82; 700/115, 116, 213; 173/50, 200
See application file for complete search history.

(56) References Cited

U.S. PATENT DOCUMENTS

| 3,651,465 A | 3/1972 | Law et al. ............... 340/149 R |
| 5,123,494 A | 6/1992 | Schneider ..................... 177/50 |
| 5,635,906 A | 6/1997 | Joseph ........................ 340/572 |
| 5,771,657 A | 6/1998 | Lasher et al. .................. 53/55 |

(Continued)

FOREIGN PATENT DOCUMENTS

WO    WO 98/09598    3/1998

OTHER PUBLICATIONS

U.S. Appl. No. 10/960,891, filed Oct. 6, 2004, Prater et al.

(Continued)

*Primary Examiner*—Bryan Bui
(74) *Attorney, Agent, or Firm*—Seed IP Law Group

(57) ABSTRACT

A method, system, and computer-readable medium is described for automatically identifying incongruous item packages, such as to detect incongruities in the items that are included as contents of the item packages and/or to identify incongruities in the packaging used for the item packages. In some situations, the automatic identification of incongruous packages includes initially automatically learning appropriate values for parameters of items (e.g., item weights and/or dimensions) based on automatically measured parameters of packages including those items. Those item values can then be used to estimate corresponding parameter values of sealed packages that contain those items, and to further identify incongruous item packages whose measured parameter values do not correspond to the estimated values for those parameters. This abstract is provided to comply with rules requiring an abstract, and it is not intended to be used to interpret or limit the scope or meaning of the claims.

64 Claims, 9 Drawing Sheets

U.S. PATENT DOCUMENTS

| | | | |
|---|---|---|---|
| 6,014,654 | A * | 1/2000 | Ariyoshi ..................... 706/62 |
| 6,522,945 | B2 | 2/2003 | Sleep et al. ................. 700/225 |
| 2003/0176942 | A1 | 9/2003 | Sleep et al. ................. 700/213 |
| 2005/0198920 | A1 | 9/2005 | Nakagawa et al. ............. 53/64 |

OTHER PUBLICATIONS

U.S. Appl. No. 10/960,448, filed Oct. 6, 2004, Prater et al.

Ashtree Label Systems, "Weighing Systems," retrieved Jan. 16, 2004, from http://www.ashtreelabels.com/weighing.htm.

Cargoscan AS, "Optimise Shipping Costs," retrieved Jan. 16, 2004, from http://www.cargoscan.com/OptShipping.asp.

Cargoscan AS, "Why Dimensioning?," retrieved Jan. 16, 2004, from http://www.cargoscan.com/WhyDimensioning.asp.

Fritz Fuss GmbH & Co., "Counting Mass-Produced Parts: Ready for Tomorrow's Electronic Data Handling," retrieved Jan. 16, 2004, from http://www.mt.com/mt/secureDownload/secureDownload.jsp?m=t&s=iiMA&f=RwLm51NzB1ZmZlL3N1bG1mX2Y0_DQ4MDAwMjNhNjIwMDA0NDY0MjAwMHgwXzcwZWZmZS81L2NpcmVuZUcvbGFpcm90aWRFL3N1bG1mX3R4ZV90bS8biZm&c=FJUk9USURFTE&k=gxMjg4NjM1_T',%20450,%20770.

Fuller Weighing Systems, "Model CIM100—in Motion Checkweigher," retrieved Jan. 16, 2004, from http://www.fullerweighing.com/checkweigher.htm.

Hartman, L., "Weighing Keeps Food Packaging Costs in Check," Packaging Digest, Jun. 2004, retrieved Jul. 12, 2004, from Packaging Digest website: http://www.packagingdigest.com/articles/200406/36.php.

Hi-Speed Checkweigher Co., Inc., "Checkweighers and Material Handling Solutions for the Packaging Industry," retrieved Jan. 16, 2004, from http://www.hispeedcheckweigher.com.

Hi-Speed Checkweigher Co., Inc., "Success Stories," retrieved Jan. 16, 2004, from http://www.hispeedcheckweigher.com/success.htm.

Loma Systems, "Product Information: Information Systems," retrieved Jul. 12, 2004 from http://www.loma.com/info_systems/index.html.

Loma Systems, "The AS Range—Checkweighing," retrieved Jul. 12, 2004, from Loma Systems website: http://www.loma.com/prod_lit/pdf_files/as range uk.pdf.

Mettler-Toledo International Inc., "Industrial Weighing," retrieved Jan. 16, 2004, from http://www.mt.com/mt/filter_link/apf.jsp?m=t&tr=Y2NTU3MzcwMS1DfDU2NjU1NzM3MDEtQwiiNz, 2 pages.

Mettler-Toledo International Inc., "Inventory Control," retrieved Jan. 16, 2004, from http://www.mt.com/mt/filter_link/af.jsp?m=t&tr=YzNDU3MzcwMS1BfDc2NjU1NzM3MDEtQ3w1NjY1NTczNzAxLUMi_T.

SmartLinc, "SmartPack—Pack Verification & Shipping Module Enables Distribution Improvements", retrieved Dec. 23, 2003, from http://www.smartlinc.net/pvsm.html, 2 pages.

\* cited by examiner

Example Item Parameter DB

| | Item ID | Item Name | Item Type | Mean Item Weight (lbs) | Mean Item Height (inches) | Mean Item Width (inches) | Mean Item Length (inches) |
|---|---|---|---|---|---|---|---|
| 114 | 432543 | Book1 | Book | 1.20 | - | - | - |
| 115 | 230948 | Book2 | Book | - | 10.50 | 9.00 | 1.35 |
| 116 | 087341 | CD1 | CD | - | - | - | - |
| 117 | 183203 | DVD1 | DVD | - | - | - | - |
| 118 | 998310 | Wine1 | Wine | - | - | - | - |
| 119 | 813413 | CerealBox1 | CerealBox | - | - | - | - |
| | ... | | | | | | |

Example Packaging Parameter DB

| | Packaging ID | Packaging Name | Packaging Type | Mean Weight (lbs) | Volume (cu. ft.) | Height (inches) | Width (inches) | Length (inches) |
|---|---|---|---|---|---|---|---|---|
| 131 | 413309 | SmallBox1 ("SB1") | Box | 1.00 | 0.58 | 10.00 | 10.00 | 10.00 |
| 132 | 293742 | SmallBox2 ("SB2") | Box | 1.20 | 1.07 | 12.00 | 11.00 | 14.00 |
| 133 | 338922 | BigBox1 ("BB1") | Box | 2.30 | 3.56 | 16.00 | 16.00 | 24.00 |
| 134 | 103088 | SmallAirBag ("SAB") | Dunnage | 0.05 | 0.20 | 3.50 | 9.00 | 11.00 |
| 135 | 391879 | StandardPromo ("SP") | Insert | 0.01 | 0.00 | 7.00 | 5.00 | 0.01 |
| 136 | 789320 | HolidayPromo ("HP") | Insert | 0.02 | 0.01 | 8.00 | 6.00 | 0.35 |
| | ... | | | | | | | |

*Figure 1A*

Example Sealed Package Parameter Measurements DB

| | Package ID | Box | Dunnage | Inserts | Item Contents (xN = N copies) | Package Weight (lbs) |
|---|---|---|---|---|---|---|
| | 141 | 142 | 143 | 144 | 145 | 146 |
| 151 | 872093 | SB2 | SABx4 | SP | Book2, DVD1x2 | 3.81 |
| 152 | 832189 | SB2 | SABx2 | SP | Book2 | 3.11 |
| 153 | 098731 | SB1 | SABx2 | SP | Book1x2 | 3.41 |
| 154 | 631248 | BB1 | SABx6 | SP | Book1, Book2 | 5.56 |
| 155 | 123481 | SB2 | SABx3 | SP | DVD1x3, CD1x3 | 2.86 |
| 156 | 523418 | SB1 | SABx2 | SP | DVD1 | 1.40 |
| 157 | 328973 | BB1 | SABx10 | SP | Book2x2, DVD1 | 6.71 |
| 158 | 089132 | SB2 | SABx3 | SP | Book2, DVD1, CD1 | 3.66 |
| 159 | 873189 | SB2 | SABx2 | SP | Book1, Book2 | 4.27 |
| 160 | 613495 | BB1 | SABx5 | SP | CD1, Wine1, CerealBox1 | 7.26 |
| | ... | | | | | |

Example Item Contents Weight Estimation

| Estimated Item Contents Weight (lbs) | Book1 | Book2 | DVD1 | CD1 | Wine1 | Cereal Box1 |
|---|---|---|---|---|---|---|
| 150a | 150b | 150c | 150d | 150e | 150f | 150g |
| 2.40 | 1.20 | - | - | - | - | - |
| 1.80 | 1.20 | 1.80 | - | - | - | - |
| 2.30 | 1.15 | 1.80 | 0.30 | - | - | - |
| 2.95 | 1.15 | 1.80 | 0.30 | - | - | - |
| 1.50 | 1.15 | 1.80 | 0.30 | 0.20 | - | - |
| 0.29 | 1.15 | 1.80 | 0.30 | 0.20 | - | - |
| 3.90 | 1.15 | 1.80 | 0.30 | 0.20 | - | - |
| 2.30 | 1.15 | 1.80 | 0.30 | 0.20 | - | - |
| 2.96 | 1.15 | 1.80 | 0.30 | 0.20 | - | - |
| 4.70 | 1.15 | 1.80 | 0.30 | 0.20 | - | - |

*Figure 1B*

Example Sealed Package Parameter Estimation

| | Package ID | Box | Dunnage | Inserts | Intended Item Contents (xN = N copies) | Actual Package Weight (lbs) | Estimated Package Weight (lbs) | Manual Review |
|---|---|---|---|---|---|---|---|---|
| | 181 | 182 | 183 | 184 | 185 | 186 | 187 | 188 |
| 156 | 523418 | SB1 | SABx2 | SP | DVD1 | 1.40 | 1.41 | |
| 157 | 328973 | BB1 | SABx10 | SP | Book2x2, DVD1 | 6.71 | 6.71 | |
| 158 | 089132 | SB2 | SABx3 | SP | Book2, DVD1, CD1 | 3.66 | 3.66 | |
| 159 | 873189 | SB2 | SABx2 | SP | Book1, Book2 | 4.27 | 4.26 | |
| 160 | 613495 | BB1 | SABx5 | SP | CD1, Wine1, CerealBox1 | 7.26 | - | |
| 161 | 347101 | SB2 | SABx2 | SP | Book1, Book2 | 4.17 | 4.26 | |
| 162 | 743128 | SB1 | SABx4 | - | Wine1x2, CerealBox1x3 | 11.80 | - | |
| 163 | 129347 | SB1 | SABx2 | SP | Wine1 | 3.95 | 4.01 | X |
| 164 | 831904 | SB2 | SABx4 | SP | Book1, Wine1 | 5.35 | 5.46 | |
| 165 | 001347 | BB1 | SABx15 | HP | DVD1x3 | 3.99 | 3.97 | |
| 166 | 991731 | SB1 | SABx2 | SP | DVD1 | 1.31 | 1.41 | X |
| 167 | 913741 | SB1 | SABx2 | SP | Book2, CD1 | 3.12 | 3.11 | |
| 168 | 121318 | SB2 | SABx2 | SP | DVD1x10 | 3.33 | 4.31 | X |
| 169 | 093283 | SB2 | SABx2 | SP | Book2x2, DVD1 | 5.10 | 5.21 | X |
| 170 | 303748 | SB2 | SABx3 | SP | Wine1, DVD1 | 4.49 | 4.56 | X |
| 171 | 721893 | SB2 | SABx3 | SP | Book1, CerealBox1 | 4.02 | 4.11 | |
| 172 | 465928 | SB2 | SABx2 | SP | Book1, Book2 | 4.16 | 4.16 | |

*Figure 1C*

Example Updated Item Parameter DB

| Item ID | Item Name | Item Type | Mean Item Weight (lbs) | ... |
|---|---|---|---|---|
| 432543 | Book1 | Book | 1.05 | |
| 230948 | Book2 | Book | 1.80 | |
| 087341 | CD1 | CD | 0.20 | |
| 183203 | DVD1 | DVD | 0.30 | |
| 998310 | Wine1 | Wine | 2.90 | |
| 813413 | CerealBox1 | CerealBox | 1.60 | |
| ... | | | | |

*Figure 1D*

AUTOMATICALLY IDENTIFYING INCONGRUOUS ITEM PACKAGES

CROSS-REFERENCES TO RELATED APPLICATIONS

This application is a continuation of U.S. patent application Ser. No. 10/827,614, filed Apr. 19, 2004, now U.S. Pat. No. 7,085,677 issued Aug. 1, 2006, which is hereby incorporated herein by reference.

TECHNICAL FIELD

The following disclosure relates generally to automatically identifying incongruous packages, such as by analyzing observable parameters of packages that are sealed for shipping to identify incorrect non-observable items that are included in the contents of the packages.

BACKGROUND

Many companies package groups of items together for a variety of purposes, such as e-commerce and mail-order companies that package items (e.g., books, CDs, apparel, food, etc.) to be shipped to fulfill orders from customers. A common concern with such packages, referred to herein as "item packages," involves ensuring the accuracy of the items included in the contents of such packages. Such content accuracy is not only very important for customer retention and goodwill purposes, but also for inventory control, tracking purposes, and the costs associated with inaccurate item contents (e.g., handling customer support calls and item returns for packages shipped to customers). A related problem involves ensuring that appropriate packaging materials are used for such item packages, both to minimize costs and to protect the item contents.

These problems with ensuring the accuracy of item package contents and the use of appropriate packaging materials are made even more difficult in situations in which a company has a very large number of diverse items that may be included in package contents, when the available items can frequently change (e.g., to add new items that become available, as well as to remove discontinued items or items that are otherwise unavailable), when some or all of the available items are provided by third-parties (e.g., third-party sellers), and when the items themselves may change over time (e.g., due to a change in the packaging of a particular item and/or changes in the item itself).

One technique that can be used to attempt to address such problems involves manual review of all packages after the package preparation process is complete. However, such manual review is practical only when the item contents of the packages can be directly observed by the person performing the review, such as when the packages are unsealed and open and/or the packaging material that is used is transparent. Moreover, even in those circumstances, such manual review is extremely costly and does not ensure that manually verified open packages do not have subsequent changes to the package contents. Furthermore, manual review techniques are prone to errors.

A similar technique to manual review involves tracking the items as they are added to packages as part of the package preparation process, whether performed manually (e.g., via checklists) or automatically (e.g., by scanning bar codes or other identifying information for the items as they are placed in the package). However, such item tracking efforts are also subject to error, and similarly share the problem of ensuring that subsequent changes to package contents do not occur after item tracking is completed. Moreover, even if manual review or item tracking techniques were able to accurately verify the identity of the items in a package's contents as being accurate, such techniques would not typically identify problems that may occur with a particular item in the package contents (e.g., a manufacturing problem with the item, such as a book that is missing a number of pages or a sealed CD case that is missing the actual CD).

Another related technique that has been used in the past is to selectively sample and check a small number of sealed packages that are otherwise ready to be shipped, such as by opening the packages and verifying their item contents. However, such package sampling merely provides an estimate of an overall error rate with the packages rather than identifying and correcting problems with individual packages.

Other prior art systems use weight as part of an automated process for tracking or checking purposes. For example, some prior art systems attempt to verify that an individual item is complete as it is being prepared, such as to weigh a bottle being filled with a liquid to ensure that it has a particular quantity of the liquid or to weigh an item that includes a number of individual pieces to ensure that the quantity of pieces included is correct (e.g., that a medicine bottle has the correct number of pills). Other systems weigh items as part of automated checkout systems, such as at grocery stores. However, such techniques do not weigh completed multi-item packages to ensure that the package contents include the items intended to be included, nor do they consider non-weight parameters of the items. Furthermore, such techniques typically require that all the weights of all the items that could be in the packages be known and available at the time of checking.

More generally, none of these prior techniques automatically handle situations with large numbers of items that can frequently change, nor do they handle variations and changes to individual items in an automated manner. Thus, it would be beneficial to provide techniques for automatically ensuring the accuracy of item package contents and the appropriateness of packaging for such item packages, particularly in environments with changing items.

BRIEF DESCRIPTION OF THE DRAWINGS

FIGS. 1A-1D illustrate examples of automatically identifying incongruous item packages in an environment with changing items.

DETAILED DESCRIPTION

Figure 2:
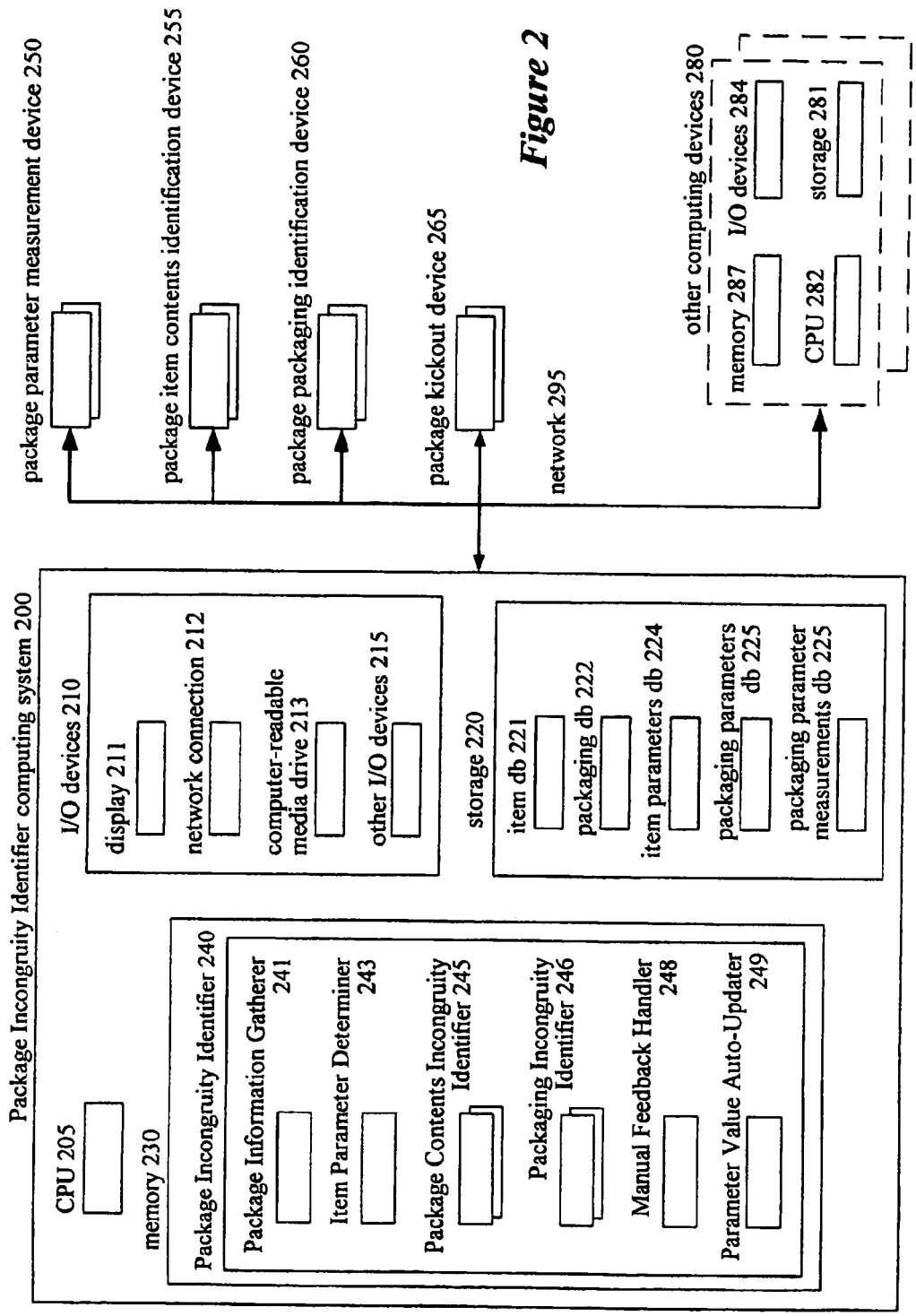
FIG. 2 is a block diagram illustrating an embodiment of a system for automatically identifying incongruous item packages.

A software facility is described below that automatically identifies incongruous item packages, such as to detect incongruities in the items that are included as contents of the item packages and/or to identify incongruities in the packaging used for the item packages. In some embodiments, the facility operates in environments in which the items that are available for inclusion in packages frequently change and/or in which available items themselves can change, with the facility automatically adapting to such changes.

In particular, in some embodiments the automatic identification of incongruous packages includes initially automatically learning appropriate values for one or more parameters of items (e.g., item weights and/or dimensions) that are available to be included in item packages based on automatically measured parameters of item packages that are prepared for shipping. After automatically identifying such item parameter values, those values can then be later used to estimate corresponding parameter values of sealed packages that contain those items in their contents, and to identify incongruous item packages whose measured parameter values do not correspond to the estimated values for those parameters. Furthermore, in some such embodiments the appropriate values for item parameters continue to be dynamically learned and improved after they are initially automatically identified based on subsequent measurements.

As one example embodiment, the facility may be used as part of a distribution operation for an organization that ships large numbers of item packages to customers. In this example embodiment, the organization maintains information about each of the items that is available to be shipped, but that item information does not include verified weights or dimensions of the items. However, by weighing packages that are being shipped, the facility can automatically learn weights of the items that are included in the item package contents, such as by comparing weights for packages with overlapping item contents. When the facility has sufficient weight information for the items intended to be the contents of an item package, the facility can then anticipate a total weight of the package based on those item weights and on the weights of the package's packaging (e.g., an exterior box and dunnage inside the box) and any other non-item contents of the package (e.g., a promotional insert from the organization). When the actual weight of the package differs from the anticipated weight by an amount that exceeds a specified threshold, the package can then be automatically identified for manual review and correction as needed. In this manner, a variety of types of incongruous item packages can be identified, such as packages that weigh too much due to extra items being included, packages that weigh too little due to missing items, and packages with inappropriate weights due to the package including items in place of intended items and/or intended items whose weight differs sufficiently from normal due to problems with the items. Thus, incongruities in item packages may reflect a variety of types of unexpected conditions, including unexpected benefits of various types in some embodiments and/or situations.

In a similar manner, measurable parameters of items other than weight can also be learned and used, whether instead of or in addition to weight. For example, in some embodiments, dimensions and/or volume of items can be automatically learned based on corresponding values for packages that include those items, and those learned item parameter values can subsequently be used to identify packages whose dimensions and/or volume are inappropriate for those items. Depending on the types of items and packaging materials used, a variety of other types of measurable parameters can similarly be used in appropriate situations in some embodiments, such as color, temperature, smell and other emissions, texture, rigidity, sound, balance along one or more dimensions, radiation, rates of change in one or more of the parameters, etc. In addition, in some embodiments the parameters of the packaging materials and any other non-item contents are also automatically learned, while in other embodiments such parameters may instead be supplied to the facility as an input.

In some embodiments, after an item package has been automatically identified as a likely incongruous package, the package is automatically diverted from the shipping process (as a "kick-out" package) for additional review (e.g., manual review). For sealed packages whose contents are not directly observable, the additional review may include opening the package and manual inspecting of the items in the package and any other non-item contents to verify that the intended items are present and that non-intended items are not present. When incorrect items are included in the contents, the package contents will be corrected before the package is reinserted in the shipping process, and other action may further be taken to remedy the cause of the incorrect item contents (e.g., by tracking down and eliminating the cause of the problem). If the contents of the item package include only the intended items and appropriate non-item contents, the manual review may in some embodiments further include taking individual measurements of one or more parameters of the items in the contents, such as to weigh those items. Such additional measurements may allow identification of a particular item that has a problem (e.g., a book with a large number of missing pages), and also provides a current verified value for the measured parameters of items that do not have a problem. The results of the manual review can then be automatically incorporated by the facility in an appropriate manner, such as to update learned item parameter values to reflect the measured package parameter values when no problems were identified and/or to reflect one or more actual measured values from the review (e.g., by replacing the learned value with the actual measured value, by adjusting a range of allowable values for the parameter for that item, by adjusting the uncertainty associated with the learned item parameter value, etc.).

Thus, in some embodiments, the facility may perform an initial learning phase in which item parameter values are learned to a sufficient degree of accuracy, and may then enter an active evaluation phase in which item packages being shipped are evaluated for incongruities based on the learned item parameter values. While this initial phase may in some embodiments be a sufficient length to learn the parameter values for all of the available items, in other embodiments the facility instead begins to evaluate packages as soon as it has sufficient data for the items intended for inclusion in the contents of those packages. The determination of when sufficient data for an item parameter value has been reached can be performed in various ways in various embodiments, including by having a single measurement for a parameter value, having a specified minimum number of measurements, having sufficient measurements to reach a specified statistical level of uncertainty or confidence, etc. In addition, in some embodiments the allowable variation in a parameter's value for an item is based on a statistical measure for the item (e.g., a standard deviation from the mean).

Moreover, in some embodiments the facility continues to estimate item parameter values on an ongoing basis even after an initial learning phase, thus allowing additional item parameter value estimations to refine previously estimated parameter values (e.g., by adjusting the value, by reducing uncertainty as to the actual value, by identifying outliers to be ignored, etc.). This process can be performed in a variety of ways in various embodiments, including by discounting or ignoring older estimated parameter values for an item in favor of more recent values, by looking for patterns in the parameter values for an item to identify consistent changes or a trend over time to allow a better estimation of future parameter values, etc. In addition, such ongoing analysis permits the facility to dynamically learn parameter values for new items that are added, as well as to identify changes to individual items (e.g., due to a change in materials used for the item or packaging of the item). In addition, some item parameters may have values that vary in different manners, such as can be represented with a standard bell curve, a step function, a multi-modal distribution with two or more distinct allowable value groupings, etc., and, if so, the facility will incorporate such details when identifying incongruous item packages.

In addition, analysis of measured values can also be used in some embodiments not only to identify potential problems with specific packages, but also to identify problems with specific measurement devices, such as a scale that is consistently high or low. Such identification of problems with measurement devices can be performed in various ways, such as based on patterns in measured weights or other parameter values from a measurement device that differ from those of other devices and/or based on manual feedback (e.g., for a kick-out package that is correct, or from an independent measurement source). Once such identification of a problem with a measurement device has occurred, it may in some embodiments be handled quickly (e.g., in real-time) in one or more of a variety of ways so as to prevent future kickouts that are based on inaccurate information from the measurement device, such as by having the measurement device taken offline or fixed, or instead by automatically adjusting values from the measurement device to reflect a consistent inaccuracy. Such problems with measurement devices can reflect a variety of conditions, including consistent offsets, drifts, a broken device, excessive vibration, a calibration problem, etc.

In some embodiments, identifications of package incongruities are performed in a real-time or near real-time manner, such as to enable any consistent ongoing problems that are identified to be immediately addressed. For example, if a problem with a particular item is repeatedly recognized such that those copies of the item with the problem should not be shipped, the facility can recognize that ongoing problem and immediately take steps to remedy the problem with minimal disruption to the normal shipping process (e.g., by indicating to automatically kick-out for manual review any packages that are currently in the preparation process that include that item, indicating to postpone preparation of any packages that are to include the item, reducing any allowable variance with respect to that item so as to maximize the likelihood of identifying other packages that include copies of the item that have the problem, etc.). Similarly, if a measurement device or other device involved in the package preparation process appears to have a consistent problem (e.g., including improper amounts of dunnage in packages), the facility can take immediate action to fix that device or to minimize its effects (e.g., by automatically adjusting estimated package parameter values for a particular measurement device to correspond to that measurement device's consistent measurement errors).

In addition, in some embodiments the facility further considers additional factors when estimating parameter values. For example, with respect to parameters such as weight and dimension, values for those parameters can vary for at least some items and packaging materials based on factors such as current temperature, humidity, altitude, etc. In addition, when a particular item or type of packaging material can be supplied from multiple suppliers, estimated values for parameters for those items can be adjusted as appropriate based on the supplier if variations based on the supplier occur. More generally, a variety of techniques can be employed to track a variety of environmental and other relevant factors corresponding to items and packaging materials in order to determine which of the factors has a possible causal or correlative effect on the values of the parameter, and estimated values for those parameters can then be adjusted to reflect those factors, such as automatically and in a real-time manner.

As previously noted, in some embodiments feedback to improve the automatic incongruity identification process can be received and used both based on information resulting from manual review of kick-out packages and on analysis of one package parameter measurements with respect to other package parameter measurements. In addition, in some embodiments other sources of information can also be used to influence the automatic incongruity identification process. For example, in some embodiments post-shipment indications of package contents accuracy and packaging material appropriateness are tracked and used, such as based on calls to customer support and/or item/package returns due to problems. For packages that are not automatically identified as incongruous but that later show such problems, the previously stored parameter values corresponding to that package can be analyzed and updated accordingly (e.g., to discount or ignore the package parameter measurements for that package, to narrow an allowable deviation for one or more of the intended items for the package contents if the package narrowly fell within an allowable deviation when it was shipped, etc.). In addition, in some embodiments an external party (e.g., a supplier or manufacturer of an item) may provide some parameter value information for items—in some embodiments, such third-party information is used as an initial default value for the parameter that may then be adjusted by the facility, while in other embodiments such information may instead be treated in other manners (e.g., ignored, given a discounted value with respect to estimated values, given a more highly weighted value with respect to estimated values, etc.).

For illustrative purposes, some embodiments of the software facility are discussed below in which particular item and package parameters are analyzed in particular manners, and in which particular types of analysis and processing of incongruous item packages is performed. However, those skilled in the art will appreciate that the techniques described can be used in a wide variety of other situations, and that the invention is not limited to the details of these example embodiments.

In particular, FIGS. 1A-1D illustrate examples of some of the described techniques for automatically identifying incongruous item packages, and additional examples are later discussed that provide additional exemplary details related to techniques for calculating estimated item weights and allowable weight deviations.

With respect to the current examples, FIG. 1A illustrates an example item parameter database 100 and packaging parameter database 120 that are used to store values for various item and packaging parameters. In this example embodiment, an e-commerce organization sells items of various types that can be shipped to customers. For the sake of simplicity, six example items are shown in entries 114-119 of the item parameter database, with each item having a corresponding unique ID, name, and type in columns 101-103. The item parameter database also includes columns to store values for various parameters of the items in columns 104-110, which in this example embodiment include item weight, and item dimensions of height, width, and length. While not shown, in other embodiments additional information may be stored, such as information on statistical variances in the parameter values or other indications of allowable deviations from the estimated values.

In this example embodiment, the Book1 item has an initial associated item weight of 1.2 pounds that was supplied by a manufacturer of the item, and item Book2 includes initial dimension values supplied by its manufacturer. The other parameter value fields of the item parameter database are initially empty, as the facility has not yet dynamically learned appropriate values for those parameters. However, the facility does have previously determined values for the various parameters of the packaging material that can be used when shipping the items to customers in this example embodiment, as shown in columns 124-128 of the packaging parameter database. Pre-determination of such values may make sense in a variety of situations, such as when there is only a small number of possible packaging materials, when the packaging materials change only infrequently (if at all), when reliable values for parameters of those materials are available from an external source, etc. In this example, the packaging materials include three types of boxes in which items can be packaged (as shown in entries 131-133 of the database), inflatable air bags (also referred to as "air pillows") for dunnage to protect item contents during shipping (as shown in entry 134), and various promotional inserts (e.g., printed material) for inclusion in packages (as shown in entries 135-136).

FIG. 1B illustrates an example package parameter measurements database 140 that reflects measured parameter values for packages being shipped by the organization. In particular, in this example each of the entries 151-160 of the database include information regarding a different package, with each package having a unique ID 141. The database also includes information about the packaging materials 142 and 143 used for the packages, the item contents 145 of the packages, and the non-item contents of the packages 144. While various types of parameter measurements may be used, as discussed elsewhere, in this example the weight parameter is used (as shown in column 146 of the database).

In particular, after each package is filled and sealed, the package is weighed in an automated manner as part of the standard shipping process, and the package measurement weight is stored in the database. In addition, other information related to a package may be automatically determined in various ways, such as by automatically determining the packaging materials and package contents for a package by scanning a bar code on the exterior of a package to identify the type of box and by scanning a bar code or other information on a packing slip or shipping invoice that can be mapped to the various intended contents of the package. Such package contents and/or packaging materials may be determined in other manners in other embodiments.

Since item weights are not yet known for the various items that are available to be shipped (other than the manufacturer-supplied weight for the Book1 item), the facility initially uses the measured package weights to automatically learn the weights of the various items. In particular, column 150a in FIG. 1B illustrates for each of the packages a current estimated weight of the item contents in the package, which can be determined in this example embodiment by reducing the total measured package weight by the weight of the packaging material used and the non-item contents.

After determining the estimated item contents weight for a package, the facility can then begin to learn the weights of individual items. For example, with respect to the package shown in entry 151, the estimated item contents weight of 2.4 pounds reflects the weight of a combination of one copy of the Book2 item and two copies of the DVD1 item. Since that information alone is not enough to identify the specific weight of the Book2 item or the DVD1 item, the entries in columns 150c and 150d for those items remains blank after processing of the package 151 entry, as do the entries 150e-150g for the CD1, Wine1 and CerealBox1 items. The manufacturer-supplied weight for item Book1 is shown in column 150b for reference purposes, but in this example embodiment any manufacturer-supplied parameter values for items are ignored for the purposes of the automatic incongruity identification.

In a similar manner, the package shown in entry 152 has estimated item contents weights of 1.8 pounds, which in this case can be mapped directly to the Book2 item, since it was the only item included in the item contents of that package. Thus, entry 150c now shows a value of 1.8 pounds as an estimated weight for the Book2 item. In addition, in this example embodiment the facility also automatically estimates the weight of item DVD1 based on the combination of information for packages 151 and 152, although in other embodiments the facility may not combine such current information with information from prior packages in that manner, or may do so only on a periodic basis rather than in a real-time manner as is shown. The package for entry 153 then provides the opportunity to estimate a weight of the Book1 item, which is determined to be 1.15 pounds, as shown in column 150b for entry 153.

When the package in entry 154 is processed, with package contents of items Book1 and Book2, the facility could perform an automatic incongruity identification for the package based on weight, since estimated weights are already available for each of the intended item contents. However, in this example embodiment the facility instead uses the measured package weight as another data point for learning the weights of the included items, with the total item contents weight in this example being consistent with the prior estimated weights for the items (and thus, for example, reducing the uncertainty associated with those estimated weights). Entry 155 then reflects a package whose contents include the items DVD1 and CD1, allowing the weight of the CD1 item to be estimated as being 0.2 pounds. While not illustrated in this example, multiple measured weights for an item may be stored (e.g., all weights, a specified number of the most recent weights, etc.), such as to allow calculations of averages and other statistical measures for item weights. Similarly, in other embodiments additional information may be stored and used for specific items, such as a range of allowable weights for an item (e.g., based on a minimum and maximum allowable weight that is determined after multiple weight measurements) and/or other information that reflects quality of the weight measurements.

Entry 156 results in an estimated weight for item DVD1 of 0.29 pounds, which varies slightly from the prior estimated value for the item of 0.3 pounds based on the prior packages shown in entries 151 and 155. Such variations in measure weights can be handled in various ways in various embodiments, such as by averaging the various estimated parameter weights to arrive at a mean item weight (whether by giving all measurements an equal weight in the averaging, or instead doing a weighted average based on one or more criteria, such as to give the most recent measurements the most weight). In this example embodiment, the estimated weight for the DVD1 item remains as 0.3 pounds, such as based on a non-weighted average for the item.

Entries 157 and 158 show weights for items Book2, DVD1 and CD1 that are consistent with the prior estimated weights for those items, but entry 159 shows an estimated weight for a combination of Book1 and Book2 items that is slightly higher than the prior weight estimates for those items would reflect, although not sufficiently different to immediately change those stored item weight estimates. In the final example entry 160 in FIG. 1B, the item contents include the Wine1 and CerealBox1 items for the first time, which does not yet provide enough information to estimate the item weights of those two items, as shown in columns 150f and 150g for entry 160.

FIG. 1C illustrates various information about package weight measurements in a manner similar to that of FIG. 1B, but for a different purpose. In particular, in this example embodiment, the facility did not perform an automated incongruity identification during an initial phase that included the package shown in entries 151-160 of FIG. 1B, but begins to perform that analysis with respect to the package shown on entry 161 of the table 180 illustrated in FIG. 1C. In particular, the table 180 includes not only the actual measured weight of the package in column 186, but also an anticipated package weight 187 for the package that is estimated based on the learned item weights for the items included in the contents of those packages. The previously discussed package entries 156-160 are also illustrated in table 180 for reference purposes, and while the incongruity identification was not automatically performed for those packages in this example embodiment, the table 180 also reflects the anticipated package weights that could have been estimated for those packages.

With respect to the package shown in entry 161 of the table, the facility estimates that the package weight should be 4.26 pounds based on the previously estimated item weights for items Book1 and Book2, but the actual package weight of 4.17 pounds differs from that anticipated package weight by 0.09 pounds. In this example embodiment, items of most item types are each given an initial default allowable variation in weight of 0.05 pounds for reasons of simplicity, thus resulting in an allowable weight variation for the two items in this package of 0.1 pounds. Thus, the package shown in entry 161 is just within the allowable variation from the anticipated package weight, and is not kicked out for manual review. As discussed elsewhere, in other embodiments an allowable weight variation determination can be performed in other manners, including on a per-item basis based on a statistical variance from a mean value, by using a range of values for each item, by calculating an allowable deviation on a per-package basis rather than a per-item basis, by not allowing any deviation, etc. In addition, while not yet apparent from this single package, the difference in actual package weight from the anticipated package weight for this package is based on a change that has occurred in the Book1 item, such as based on newer copies of the item using a lighter weight material for the binding and/or pages, by reformatting the book so that less pages are used, etc. As discussed below, the facility will nonetheless automatically adapt to this change in the Book1 item over time, thus providing learning and self-healing capabilities.

Continuing now to the package shown in entry 162, the item contents again include the items Wine1 and CerealBox1. Sufficient information was not available prior to this package measurement to estimate the item weights for those two items, and thus the estimated package weight for this package shown in column 187 is not available. However, the weights of those items can now be estimated based on a combination of the packages shown in entries 160 and 162, with the Wine1 item estimated to weigh 2.90 pounds and the CerealBox1 item estimated to weigh 1.60 pounds. If this calculation is performed in real-time, the estimated value for the Wine1 item can then be used to estimate an anticipated package weight for the next package that includes that item, as shown in entry 163. In this example, the actual package weight differed from the anticipated package weight by more than the default threshold of 0.05 pounds per item, and so this package is kicked out for manual review, as shown in column 188. After that manual review reveals that the package contained accurate contents and that the copy of the Wine1 item in the package did not appear to have problems, however, that feedback is provided to the facility. In particular, in this example the feedback from the manual review causes the default 0.05 pound allowable variation for the Wine1 item to be replaced with a larger allowable variation value of 0.1 pounds, and could also be used to adjust the estimated weight for the Wine1 item.

Entry 164 reflects a package being shipped after the results of the manual review for the package shown in entry 163 have been processed by the facility. Thus, while the actual package weight differs from the anticipated package weight by 0.11 pounds, this package is not kicked out for manual review due to the larger allowable weight variation ascribed to the Wine1 item after the processing of the package in entry 163. In this case, the actual deviation in weight for this package results not from variation in the copy of the Wine1 item, but instead from the inclusion of another copy of the Book1 item with its new lower weight, although that fact is not yet detected by the facility.

The package shown in entry 165 has an actual package weight that differs only slightly from the anticipated package weight, and thus no kick out is performed. However, the package shown in entry 166 has an actual package weight that differs from the estimated package weight by 0.1 pounds, and thus the package is kicked out for manual review. For example, this weight deviation could have been caused by a switch of items in the package contents such that the contents include the CD1 item instead of the intended DVD1 item, or instead could have been caused by an absence of the two air bags that are intended to be part of the dunnage for the package. However, in this example the problem is caused by a problem with this particular copy of the DVD1 item. In particular, this copy of the item is the first one being shipped from a group of DVD1 items received by the organization that are each missing a portion of the item due to a manufacturing error (e.g., missing the actual DVD disk, or missing a paper insert inside the DVD package). Thus, this manufacturing problem represents a consistent ongoing problem with the copies of the DVD1 item that are currently being shipped (albeit a temporary one). In this example, the manual review of the package initially indicates that the item contents of the package are accurate since it includes a copy of the DVD1 item, but further investigation (e.g., based on weighing the DVD1 item) causes the manufacturing defect to be recognized and corresponding feedback to be provided to the facility.

While the manual review of the package shown in entry 166 is being performed, packages 167-169 are processed by the facility. The package in entry 167 has an actual package weight consistent with the anticipated package weight, and thus is not kicked out for manual review. However, the packages in entries 168 and 169 each include one or more copies of the DVD1 item that are affected by the DVD1 item manufacturing problem, and thus the actual package weights of those packages differ from the anticipated package weights by a sufficient amount to trigger a kick out for manual review. Based on the discovery with respect to the manual review of the package in entry 166 of the problems with the DVD1 item copy, coupled with the consistent problems in the packages shown in entries 168 and 169, the facility identifies the potential consistent ongoing problem with copies of the DVD1 item. Thus, the facility flags for manual review all additional packages that are already in the process of being prepared that include copies of the DVD1 item, including the package in entry 170 analyzed subsequent to the completion of the manual review of the package shown in entry 166. The package in entry 170 is therefore kicked out for manual review based on the inclusion of the DVD1 item in the package contents, even though the difference between the actual and anticipated package weights for this package was within the allowable deviation margin. In addition, the facility in this example temporarily postpones the preparation of any additional packages that include the DVD1 item until the ongoing problem with the item copies is resolved. In this way, immediate updating of the information used by the facility allows real-time correction of problems with packages. Moreover, even if the manual review of the package in entry 166 had not indicated the problem with the DVD1 item, the facility would in some embodiments recognize a potential problem based on the consistent lower weights for the DVD1 item across several packages.

The facility then continues to process the package in entry 171, which includes the changed copy of the Book1 item among the contents, and thus the actual weight is again approximately 0.1 pounds less than the anticipated package weight. While in this example the package is not automatically identified for manual review based on the weight deviation, such as due to a large default weight variation associated with items of the CerealBox type, the pattern of consistently lower weights for Book1 item copies over the last three packages 161, 164 and 171 that include the item causes the estimated item weight for the Book1 item to be reduced by that amount (whether based on an explicit identification of the pattern, or based on ignoring or discounting old estimates of the weight for the item in favor of new ones). Thus, when the package in entry 172 that includes the Book1 item is analyzed, the actual package weight closely matches the anticipated package weight based on the updated weight estimate for the Book1 item. In other embodiments, when a pattern of changed weights for an item is identified such as that for Book1, a package including the item could instead be kicked out for manual review to verify that the estimated weight for the item should be changed (e.g., is not a result of a consistent ongoing problem with copies of the item).

After the processing of the packages shown in FIG. 1C, the estimated item weight values are as shown in the example updated item parameter database 100 of FIG. 1D, including the newly learned weights for the Wine1 and CerealBox1 items as well as the updated weight for the Book1 item.

While the example analysis discussed with respect to FIG. 1C is performed in this example based only on the analysis of the weight parameter, in other embodiments additional processing could be done to identify potential problems. For example, packages whose item contents match those of other previously shipped packages could be compared as part of a relative analysis. Thus, for example, the change in the Book1 item weight could be noted based on comparing the packages shown in entries 159, 161 and 172, combined with other evidence indicated that the Book2 item had not changed (e.g., based on the package in entry 167 that included the Book2 item having an actual weight that closely matched the anticipated weight, or if the packages shown in entries 167 or 169 that included the Book2 item had consistent actual weights with packages prior to that in entry 159 with matching item contents). In addition, comparison of related packages can also identify problems with one or more of the packages, such as using the package in entry 169 with its item contents in an SB2 box to determine that the package shown in entry 157 with the same item contents in a BB1 box used an inappropriately large box (thus increasing materials costs and shipping costs) —similarly, any future shipment that included those same item contents could be flagged as being incongruous if it was placed in a box larger than a SB2 box.

Similarly, despite lacking sufficient weight parameter values to perform an automated incongruity identification for the package in entry 162 on that basis, that package could instead have been flagged for manual review based on the dimensions or volume of the item contents being too large to fit in the SB1 box that is indicated to have been used for the package, as well as on the basis that the four air bags indicated to have been used for dunnage for the box have a volume too large for that type of box. Thus, the actual box used may have been misidentified, or the contents of the box may not have been as shown. Similarly, if all packages are to have some specified non-item content, such as an SP insert, the package in entry 162 could have been kicked out for manual review and/or correction on that basis as well. In a similar manner, the package shown in entry 165 could have been kicked out for manual review on the basis of the indicated BB1 box being too large for the item contents and/or on the basis of the amount of dunnage used exceeding a specified threshold (which may also indicate an excessively large box being used), such as to verify that the box did not actually include additional items and/or to verify for future package processing that a smaller box should be used for those item contents. Similarly, if the packages are not to include a specified type of non-item contents at the current time, such as a time-sensitive HP insert, the box could have been kicked out for review and/or correction on that basis as well.

While not illustrated in this example, a variety of other types of item and package parameters could similarly be used, and the facility could similarly learn appropriate parameter values for the packaging materials rather than starting with defined values. In addition, changes in parameter values for packaging material and non-item contents could similarly be detected and updated in a manner similar to that for item parameter values.

FIG. 2 illustrates a server computing system 200 suitable for executing an embodiment of a Package Incongruity Identifier ("PII") system facility, as well as various other devices with which the computing system interacts. The server computing system includes a CPU 205, various I/O devices 210, storage 220, and memory 230. The illustrated I/O devices include a display 211, a network connection 212, and a computer-readable media drive 213, as well as other I/O devices 215.

An embodiment of the PII system 240 is executing in memory, and it includes various components. Users can interact with the PII system in various ways in different embodiments, such as to review and/or manually specify parameter values for items and/or packaging, as well as to specify thresholds to be used when determining allowable weight deviations. For example, some users may have physical access to the server computing system, and if so can interact with the various I/O devices 210 to provide and/or receive information. Alternatively, other users can use client computing systems to directly access the PII system, such as remotely via network 295 (e.g., via the Internet and/or the World Wide Web) by using other computing devices 280. In addition, some or all of the PII system components may provide various feedback or other general types of information to users (e.g., in response to user requests) via one or more I/O devices.

In particular, a Package Information Gatherer component 241 of the PII system operates to obtain various information about packages, such as measurements for one or more package parameters, identification of items in the package contents, packaging material used for the packages, etc. In some embodiments, the component obtains such information in an automated manner by interacting with various devices that are integrated with the package preparation process, such as one or more package parameter measurement devices 250 (e.g., scales), one or more package item contents identification devices 255 (e.g., bar code readers or scanners to obtain information from packing slips for the packages), and one or more package packaging identification devices 260 (e.g., bar code readers or scanners to obtain information from a bar code on the exterior of boxes containing the packages). After gathering such package-related information, the component stores the information in the illustrated embodiment in the packaging parameter measurements database 225 on storage, although in other embodiments the different types of package-related information may be stored in different databases. In addition, in some embodiments the non-measurement package information may already be stored in one or more databases (e.g., based on automated collection of information about the package contents and package's packaging), and if so the component could instead retrieve such information if needed from those databases after a current package is identified (e.g., based on information supplied by the devices 255 or 260).

The Item Parameter Determiner component 243 receives information about a package, whether from the Package Information Gatherer component or from one of the databases, and calculates estimated values for one or more parameters of item contents of the package. As part of the calculation, the component 243 may retrieve various information about items and packaging from the corresponding databases 221, 222, 224 and 225 on storage. After one or more item parameter values have been estimated, the information in the item parameters database 224 is updated to reflect the estimate, such as by storing the new estimates and calculating updated mean and statistical variance values for the parameters that are also stored. In other embodiments, estimated values for packaging parameters could similarly be determined and stored in the packaging parameters database 225.

When information is received for a package having one or more item contents, and the PII system already has sufficient estimated values for one or more of the parameters of those items, one or more Package Contents Incongruity Identifier components 245 (e.g., one for each parameter being used) and/or one or more Packaging Incongruity Identifier components 246 use the information about the item parameters and measured information for the package to determine whether one or more likely incongruities exist for the package. When it is determined that an incongruity is sufficiently likely, the PII system can then indicate that the package should be kicked out for manual review, such as by causing the package kick out in an automated manner by interacting with one or more package kick-out devices 265. In some embodiments, a package kick-out will occur in any component 245 or 246 indicates a likely incongruous package, while in other embodiments a package kick-out is not performed unless a specified level of agreement (e.g., unanimity) between multiple such components is reached.

In the illustrated embodiment, the PII system also includes a Manual Feedback Handler component 248, which receives information about the results from the manual review of packages that were kicked out (e.g., an indication of package correctness or incorrectness, or details about one or more verified package or item parameter values). The component then uses such information to cause the estimated stored parameter values to be updated as appropriate, whether by directly interacting with the parameters databases 224 and 225, or instead by providing information to the Item Parameter Determiner component and a packaging parameter determiner component when present. In some embodiments, the component could also receive manual feedback related to packages and item contents of packages from other sources, such as based on item/package returns and/or customer support interactions.

In the illustrated embodiment, the PII system also includes an optional Parameter Value Auto-Updater component 249, such as to do various analyses over the parameter measurements for multiple packages to identify trends in changing parameter values or to identify consistent problems with items and/or measurement devices. Such a component could operate on a continual basis (e.g., as a background process) or instead periodically, and could take various actions when a determination is made that parameter values should be updated or that other corrective action should be taken (e.g., interacting with other PII system components and/or external devices, updating values in the databases, etc.). In addition, the component may in some embodiments consider the source of values when performing updating based on them, such as to consider reliability of the values (e.g., by weighting information from manual feedback after kickout differently from automatically obtained values, such as to consider it more accurate).

Those skilled in the art will appreciate that computing system 200 is merely illustrative and are not intended to limit the scope of the present invention. In particular, the computing system and devices may comprise any combination of hardware or software that can perform the indicated functions, including computers, network devices, internet appliances, PDAs, wireless phones, pagers, etc. Computing system 200 may also be connected to other devices that are not illustrated, or instead may operate as a stand-alone system (e.g., with one or more of the devices 250-280 as integrated components). In addition, the functionality provided by the illustrated PII system components may in some embodiments be combined in fewer components or distributed in additional components. Similarly, in some embodiments the functionality of some of the illustrated components may not be provided and/or other additional functionality may be available.

Those skilled in the art will also appreciate that, while various items are illustrated as being stored in memory or on storage while being used, these items or portions of them can be transferred between memory and other storage devices for purposes of memory management and data integrity. Alternatively, in other embodiments some or all of the software components may execute in memory on another device and communicate with the illustrated computing system via inter-computer communication. Some or all of the system components or data structures may also be stored (e.g., as instructions or structured data) on a computer-readable medium, such as a hard disk, a memory, a network, or a portable article to be read by an appropriate drive. The system components and data structures can also be transmitted as generated data signals (e.g., as part of a carrier wave) on a variety of computer-readable transmission mediums, including wireless-based and wired/cable-based mediums. Accordingly, the present invention may be practiced with other computer system configurations.

Figure 3:
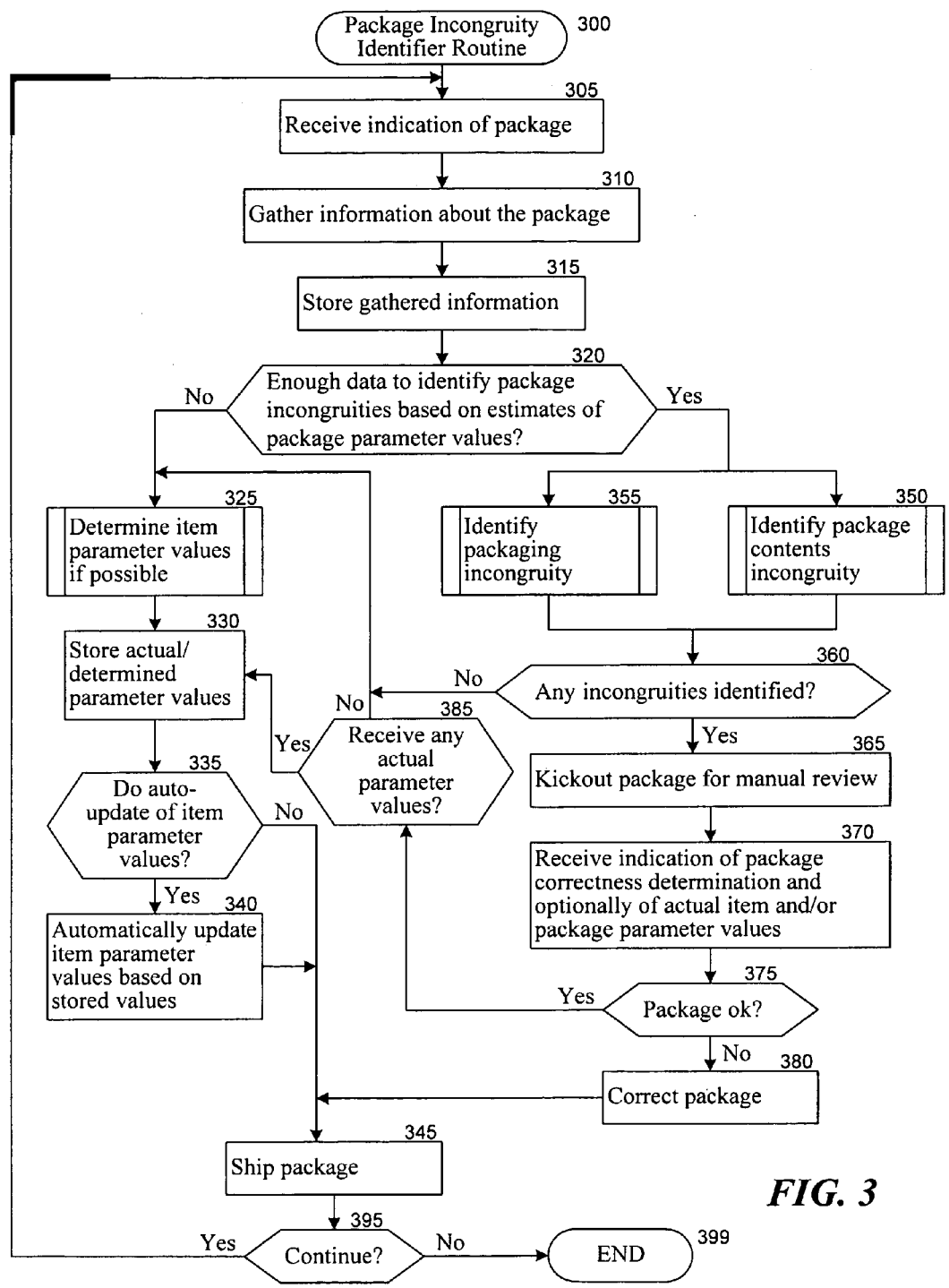
FIG. 3 is a flow diagram of an embodiment of the Package Incongruity Identifier routine.

FIG. 3 is a flow diagram of an embodiment of the Package Incongruity Identifier routine 300. The routine measures parameters of packages being shipped in order to learn parameter values of items in the package contents, and subsequently uses the learned item parameter values to automatically identify incongruous item packages based of measured parameter values of the packages.

The routine begins at step 305, where an indication is received of a package to be analyzed. The routine continues to step 310 where it gathers various information about the package, including measurements for one or more parameters of the package, an identification of the box or other exterior packaging for the package (e.g., by automatically scanning a bar code on the box that identifies the box type), an identification of intended contents of the package (e.g., by automatically scanning a bar code or other information on a packing slip or shipping label for the package that identifies the contents or indicates the package so as to allow retrieval of stored information for the package, such as information indicating items scanned as they were added to the package contents before it was sealed), etc. After step 310, the routine continues to step 315 to store the gathered information for the package.

The routine then continues to step 320 to determine whether enough data is available to identify package incongruities based on estimates of package parameter values. This can be done in various ways depending on the types of parameters being analyzed in a particular embodiment, and when a multi-parameter analysis is being performed can be performed if enough data exists for at least one parameter or instead only if all parameters have sufficient data. If there is not enough data, the routine continues to execute subroutine 325 to determine item parameter values if possible based on the available information about the package, as discussed in greater detail with respect to FIG. 4. Thus, in the illustrated embodiment, the determination of item parameter values in subroutine 325 is based only on the current package parameter information, although in other embodiments the analysis could instead consider the current package parameter information in combination with information based on prior package parameter measurements.

If it was instead determined in step 320 that enough data was available, the routine continues instead to execute subroutine 350 to identify incongruities in contents of the package and/or to execute subroutine 355 to identify incongruities in the packaging for the package. In various embodiments, only one of such types of analysis may be performed, such analyses may be performed in parallel or in serial, and a single subroutine could instead perform all of the automated incongruity analyses. After executing the subroutines 350 and/or 355, the routine continues in step 360 to determine whether any incongruities were identified. If so, the routine continues to step 365 to kick out the package for manual review. In step 370, the routine then receives an indication of the determination from the manual review of the package correctness and optionally of any actual item and/or package parameter values that were verified during the manual review. While in the illustrated embodiment the routine waits for results from the manual review before proceeding, those skilled in the art will appreciate that other embodiments could instead process any such results in an asynchronous manner and instead continue with other processing after step 365.

After step 370, the routine determines whether the manual review indicated that the package was ok, and if not continues to step 380 to correct the package before shipping the package in step 345. If it was instead determined in step 375 that the package was ok, the routine continues to step 385 to determine whether any actual parameter values were received in step 370. If not, or if no incongruities were identified in step 360, the routine returns to execute the subroutine 325 to analyze the gathered information for the package to determine item parameter values if possible based on the package parameter values.

After executing the subroutine 325, or if it was instead determined in step 385 that actual parameter values were received in step 370, the routine continues to step 330 to store the actual and/or determined parameter values. The routine then continues to step 335 to determine whether to analyze stored parameter values from multiple packages in order to determine whether to update item parameter values (e.g., on a periodic basis), such as based on data mining or other techniques used to compare multiple distinct groups of data. If so, the routines continues to step 340 to automatically update the item parameter values based on such an analysis. In other embodiments, such an explicit multi-package parameter analysis may instead not be performed, such as if current item parameter value estimates are merely used to update the prior item parameter value estimates when calculating a new item parameter value estimate (e.g., based on a mean value of all or of a specified number of prior item parameter value estimates), or may be performed continually as a background process.

After step 340, or if it was instead determined in step 335 not to perform the analysis at this time, the routine continues to step 345 to ship the package. After step 345, the routine continues to step 395 to determine whether to continue. If so, the routine returns to step 300, and, if not, the routine continues to step 399 and ends.

Figure 4:
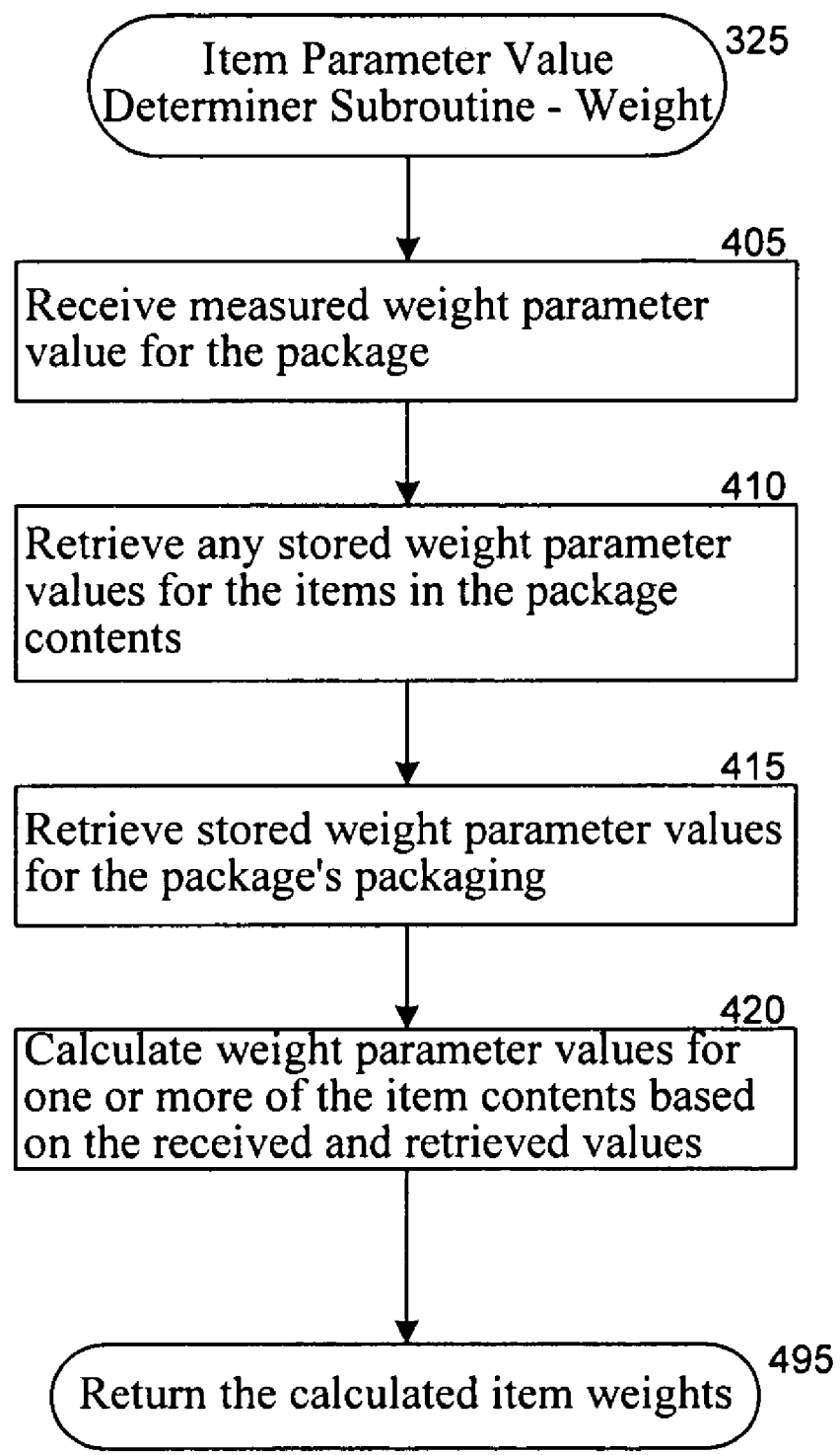
FIG. 4 is a flow diagram of an embodiment of the Item Parameter Value Determiner subroutine.

FIG. 4 is a flow diagram of an embodiment of the Item Parameter Value Determiner subroutine 325. In particular, this embodiment of the subroutine illustrates use of the weight parameter, although in other embodiments there could be multiple such subroutines that each process distinct parameters, or there could instead be a single subroutine that processed multiple parameters of interest.

In the illustrated embodiment, the subroutine begins at step 405, where gathered information about the package is received, including the measured weight parameter value for the package. The subroutine continues in step 410 to retrieve stored weight parameter values (if any) for the items indicated to be in the package contents. In step 415, the subroutine then retrieves stored weight parameter values for the packaging of the package as well as for any non-item contents. In step 420, the subroutine calculates weight parameter values for one or more of the item contents based on the received and retrieved values. For example, if there is no weight information available for only one of the items in the contents, the weight for that item would be determined. Alternatively, if weight information is already available for all of the items in the package contents, the subroutine could instead calculate whether the stored item weight values for the items are consistent with the actual package weight. After step 420, the subroutine continues to step 495 to return, providing indications of any calculated item weights and/or an indication that the currently stored item weights are consistent or inconsistent with the package weight (e.g., to modify the level of confidence in those weights).

Figure 5:
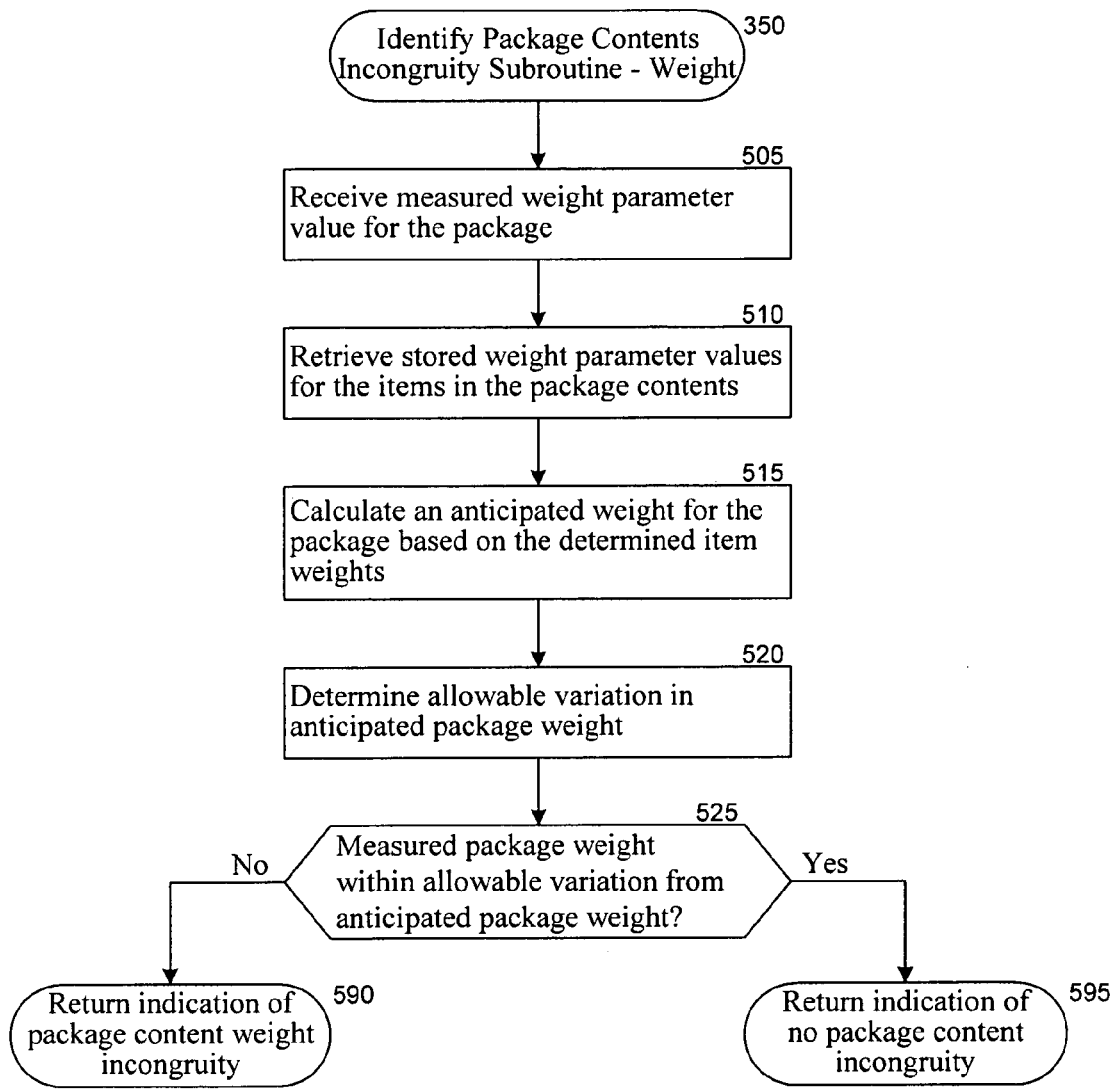
FIG. 5 is a flow diagram of an embodiment of the Identify Package Contents Incongruity subroutine.

FIG. 5 is a flow diagram of an embodiment of the Identify Package Contents Incongruity subroutine 350. In the illustrated embodiment, the automated package contents incongruity analysis is performed with respect to the weight parameter, but could be performed in other manners and based on other parameters in other embodiments.

In the illustrated embodiment, the subroutine begins in step 505, where gathered information for the package is received, including the measured weight parameter value for the package. In step 510, the subroutine retrieves stored weight parameter values for the items in the package contents, and in step 515 calculates an anticipated weight for the package based on the determined item weights and on weights for any packaging materials and non-item contents used with the package. In step 520 the subroutine then determines an allowable variation in the anticipated package weight, such as by combining a statistical variation from a mean weight for each of the items in the contents. In step 525, this subroutine then determines whether the measured package weight is within the allowable variation from the anticipated package weight. If so, the subroutine continues to step 595 and returns an indication of no package content incongruity, and if not continues to step 590 and returns an indication of package content incongruity.

Figure 6:
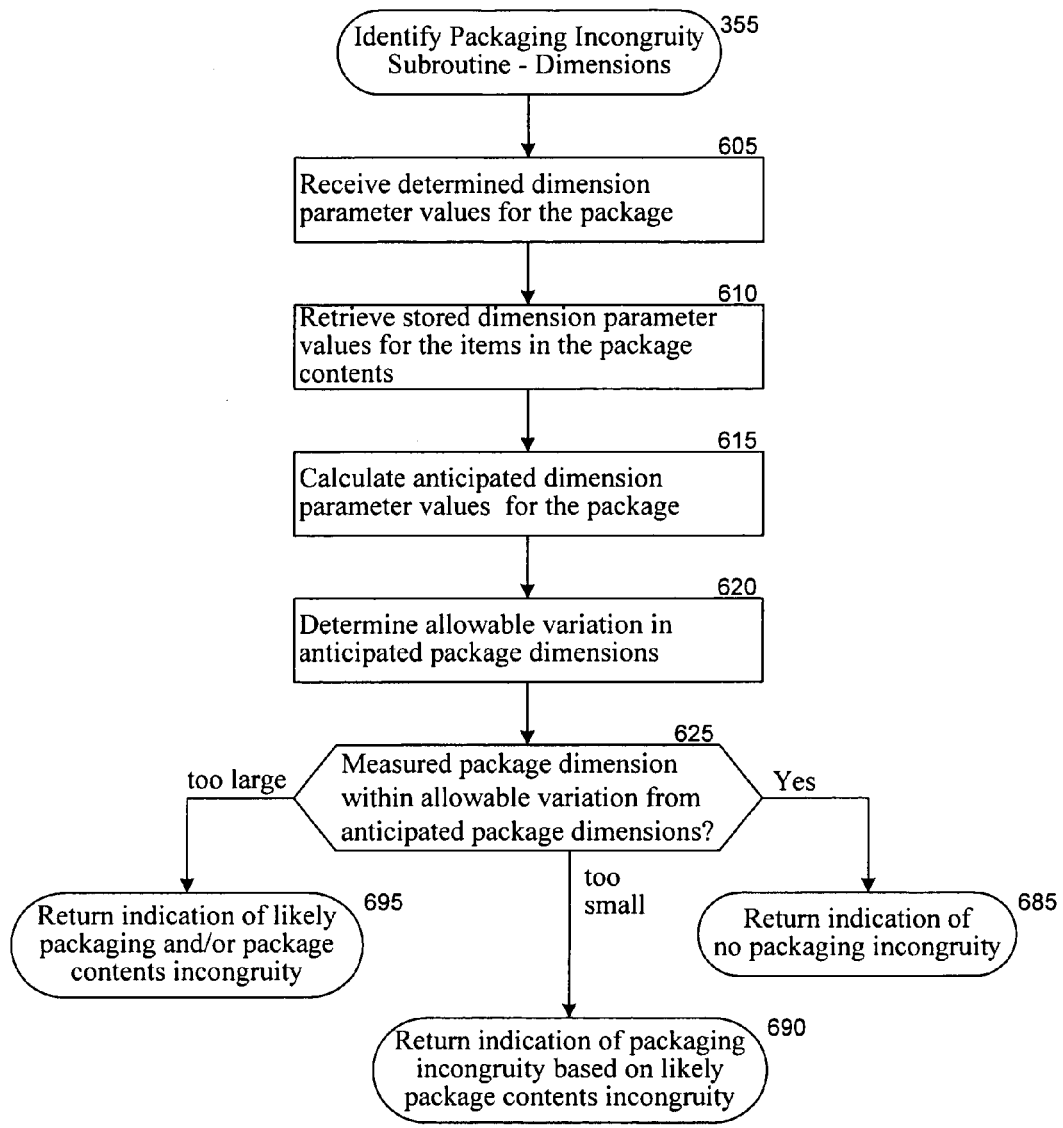
FIG. 6 is a flow diagram of an embodiment of the Identify Packaging Incongruity subroutine.

FIG. 6 is a flow diagram of an embodiment of the Identify Packaging Incongruity subroutine 355. In particular, the illustrated embodiment analyzes packaging incongruity based on dimension parameters of the package and items, although the analysis could be performed in other manners and based on other parameters in other embodiments.

In the illustrated embodiment, the subroutine begins at step 605 where it receives dimension parameter values determined for the package, such as based on stored dimensions for the type of box used for the package and/or based on measured dimensions of the package. In step 610, the subroutine retrieves stored dimension parameter values for the items in the package contents, and in step 615 calculates anticipated dimension parameter values for the package based on the item dimensions as well as dimensions of any required dunnage and non-item contents (if any). In some embodiments, the calculation of the anticipated dimension parameter values could be performed by selecting one or more predefined box types whose dimensions are a closest match to the minimum dimensions needed for the items. In other embodiments, the identification of anticipated packaging materials for the package could be performed in other manners. For example, the Automated Incongruity Identification routine 300 could track box or other external packaging types that correspond to various groups of item contents, and if so, steps 610 and 615 of the subroutine could instead retrieve an indication of one or more appropriate box types for the current item contents based on a stored mapping for those contents.

After step 615, the routine continues to step 620 to determine an allowable variation in anticipated package dimensions, such as one or more alternative box types. The subroutine then continues in step 625 to determine whether the measured package dimension values are within the allowable variation from the anticipated package dimensions. If so, the subroutine continues in step 685 to return an indication of no packaging incongruity. If it is determined in step 625 that the measured package dimension is too small relative to the allowable dimensions, the subroutine continues to step 690 to return an indication of a packaging incongruity based on a likely package contents incongruity, since the indicated package appears to be too small to fit the intended contents. If it is instead determined in step 625 that the measured package is too large relative to the allowable dimensions, the subroutine continues to step 695 to return an indication of a likely packaging and/or package contents incongruity, since the package could include additional contents or could merely be larger than is needed.

As previously discussed, the automatic identification of incongruous item packages can be performed various ways in various embodiments. The following descriptions of additional example embodiments are intended to provide additional illustrative details, but do not reflect details that need be present in all embodiments.

For example, in some embodiments the automatic learning of the estimated item weights is based on stochastic parameter estimation and the determination of an allowable variation in an anticipated weight for a package is based on a calculated confidence interval, as discussed in greater detail below. A stochastic closed-loop system can provide an adaptive method of estimating item weight data while accommodating variation in item weights, the measurement process model, and changes over time. Examples of stochastic parameter estimation techniques that can be used in various embodiments include Kalman estimators, Bayesian statistics, and models of system dynamics.

However, as a simplifying measure, the estimation of item weights is performed in some embodiments based on a deterministic approach, in which an assumption is made that there is no variation in the weights of the items or the package weight—this eliminates the need to track variations in item weights, and results in the confidence interval for allowable deviations from the anticipated package weight being zero. Thus, a linear system of equations can be used to calculate item weights, as follows:

Let $a_i \geq 0$ be the integer quantity of item i in this shipment package where i is the index into the item database. Let $w_i > 0$ be the unknown, but deterministic, weight of item i. Let $b > 0$ be the known weight of the box/dunnage. Let $p > 0$ be the measured weight of this package. Then the weight equation for any shipment $$\sum_i a_i w_i = p - b.$$

This can be generalized using matrix notation as follows. For each shipment package j, let $A_{ij} \geq 0$ be the integer quantity of each item in a package where i is the index into the item database. Assume the item database consists currently of N items. Let $w_i > 0$ be the unknown weight of item i. Let $p_j > 0$ be the measured weight of shipment package j. Let $b_j > 0$ be the known weight of the box and dunnage. Then, the linear system of equations that define the system model becomes $A\underline{w} = \underline{p} - \underline{b}$.

In addition, it is not necessary to solve this system of equations all at once, since matrix A is a sparse matrix. Any sub-matrix that provides a sufficient number of equations for the subset of unknown weights (i.e., sub-matrix is full rank) is fine. In other words, a single item package uniquely determines the weight of that item. Two package shipments, each containing different combinations of the same two items allows calculation of these two item weights. Once the items weights are computed in this deterministic system during an initialization phase, the ability to perform kick-outs is available.

In other embodiments, the estimation of item weights is performed based on a stochastic approach, with measured package weights being treated as random variables, and with item weights (which can change over time due to a number of factors) being estimated, tracked and adjusted. In some such embodiments, two assumptions are made that simplify calculations, those being that the system model is linear, and that the weights of each item, piece of packaging material and other non-item contents are statistically independent. The confidence interval or level calculated for the allowable deviation from an anticipated package weight represents the range of values where a certain percentage of measurements is expected to fall.

When computing a package weight confidence interval for use in a kick-out decision, upper and lower limits for the confidence interval are determined. These are based on the mean weight and sigma for each of the items in the package contents, the packaging for the package, and any non-item contents. However, if no weight information is available for one or more of the items in the contents of a package, then a confidence interval will not be established based on all the items in the package, and the kick-out decision is not performed—instead, a weight estimate for the item in the package contents that lacks estimated weight data (if there is only one such item) can be made. Alternatively, historical readings of packages that have more than one item with no or insufficient weight information could be maintained and then analyzed in the aggregate to determine weight information for multiple of those items (e.g., by solving an appropriate number of simultaneous equations based on the number of those items).

When weight information is available for all of the items intended to be in the contents of a package, the mean anticipated weight for the package and the allowable deviation package sigma are calculated using the items, packaging and non-item contents of the package as elements, with the mean anticipated weight being the sum of the individual means of those elements and the allowable deviation being the square root of the sum of the squares of the individual sigma values of those elements. More specifically, with the quantity of each item in the package is represented as a[i], the calculations can be performed as follows:

$$w_{pkg\_calc\_mean} = \bar{x}_{pkg\_wt} = \sum_i (a[i] \cdot \bar{x}_{item\_wt}[i]) + \bar{x}_{box\_dun\_wt}$$

-continued $$w_{pkg\_calc\_sigma} = \sigma_{pkg\_wt} = \sqrt{\sum_i (a[i] \cdot \sigma^2_{item\_wt}[i]) + \sigma^2_{box\_dun\_wt}}$$

In some embodiments, the confidence interval for an anticipated package weight is selectable, with the table below showing the value of $z_c$ for various levels of confidence.

| | Confidence Level (%) | | | | | |
|---|---|---|---|---|---|---|
| 99.9999998 | 99.99994 | 99.994 | 99.73 | 99 | 95.45 | 95 |
| $z_c$ 6.0 | 5.0 | 4.0 | 3.0 | 2.58 | 2.0 | 1.96 |

For example, the confidence interval limits (e.g., 99%) can be computed using the following equation $$USL, LSL = \bar{x}_{pkg\_wt} \pm z_c \cdot \sigma_{pkg\_wt} = \bar{x}_{pkg\_wt} \pm 2.58 \cdot \sigma_{pkg\_wt}$$

As an example, consider the following estimated item and packaging weights for an organization shipping 4 items in one of 2 box sizes, with the following mean and sigma weight values have been developed:

| Item Weight Database (FC specific) | | |
|---|---|---|
| Item | Wt_mean (lbs) | Wt_sigma (lbs) |
| Book1 | 1.2 | 0.024 |
| Book2 | 1.8 | 0.036 |
| DVD | 0.3 | 0.006 |
| CD | 0.2 | 0.004 |

| Box Weight Attribute Table (FC specific) | | |
|---|---|---|
| Box | Wt_mean (lbs) | Wt_sigma (lbs) |
| Box_sm | 0.08 | 0.003 |
| Box_lg | 0.24 | 0.009 |

Corresponding kick-out decisions using a 99% confidence interval are shown below:

| | Items Ordered | | | | Box | | Calc Pkg Wt | | | Pkg Kick Out Decision | | |
|---|---|---|---|---|---|---|---|---|---|---|---|---|
| Shipment | BK1 | BK2 | DVD | CD | Sm | Lg | x_bar | sigma | LSL | Meas Wt | USL | Kickout? |
| 1 | 2 | 1 | | | | 1 | 4.44 | 0.0503 | 4.31 | 4.48 | 4.57 | No |
| 2 | | 1 | | | 1 | | 1.88 | 0.0361 | 1.79 | 1.91 | 1.97 | No |
| 3 | 1 | | 2 | | 1 | | 1.88 | 0.0256 | 1.81 | 2.44 | 1.95 | Yes. (BK1, BK2 switcheroo) |
| 4 | 1 | 1 | 1 | | | 1 | 3.54 | 0.0446 | 3.42 | 3.65 | 3.66 | No |
| 5 | | | 3 | 3 | 1 | | 1.58 | 0.0128 | 1.55 | 1.57 | 1.61 | No |
| 6 | | | | 1 | 1 | | 0.38 | 0.0067 | 0.36 | 0.38 | 0.40 | No |
| 7 | | 1 | 1 | | 1 | | 2.18 | 0.0366 | 2.09 | 2.15 | 2.27 | No |
| 8 | | 1 | 1 | 1 | 1 | | 2.38 | 0.0368 | 2.28 | 2.23 | 2.48 | Yes. (missing CD from pkg) |
| 9 | 1 | 1 | | | | 1 | 3.24 | 0.0442 | 3.13 | 3.23 | 3.35 | No |

As noted above, such kick-out decisions can be made after appropriate weights for items have been estimated. In some embodiments, such item weight estimates are made for items within package whose measured package weight is within the LSL and USL confidence limits and thus no kick-out occurred. The best statistical estimates of item weights will be those that are based on randomness (common cause). In some embodiments, a set of the most current of a specified number (e.g., 100) of estimated item weight values for an item is used to compute an adjusted or updated mean weight and sigma for the item. In at least some such embodiments, mean and sigma weight data for the different box types and dunnage are computed directly from a separate set of measurements of empty boxes with and without dunnage.

In some embodiments, the weight delta between the measured package weight and the calculated anticipated weight for a package will be split proportionally according to each item's mean weight based on a linear system model, as this produces the minimum variance for the item weight values within the package. As shown below, the estimated weight measurement for an item is its stored previously estimated weight plus the package weight delta times the proportion of the item's weight to the calculated weight of the package.

$$w_{pkg\_meas} = \bar{x}_{pkg\_wt} + \Delta_{pkg\_wt}$$

$$= \bar{x}_{pkg\_wt} \cdot \left(1 + \frac{\Delta_{pkg\_wt}}{\bar{x}_{pkg\_wt}}\right)$$

$$= \left(\sum_i \bar{x}_{item\_wt}[i] + \bar{x}_{box\_dun\_wt}\right) \cdot \left(1 + \frac{\Delta_{pkg\_wt}}{\bar{x}_{pkg\_wt}}\right)$$

$$= \sum_i \left(\bar{x}_{item\_wt}[i] + \Delta_{pkg\_wt} \cdot \frac{\bar{x}_{item\_wt}[i]}{\bar{x}_{pkg\_wt}}\right) +$$

$$= \left(\bar{x}_{box\_dun\_wt} + \Delta_{pkg\_wt} \cdot \frac{\bar{x}_{box\_dun\_wt}}{\bar{x}_{pkg\_wt}}\right)$$

$$= \sum_i p[i] + p_{box\_dun} \text{ where}$$

$$p[i] = \bar{x}_{item\_wt}[i] + \Delta_{pkg\_wt} \cdot \frac{\bar{x}_{item\_wt}[i]}{\bar{x}_{pkg\_wt}}$$

Thus, as an example, the delta package weight and the derived weight measurements for each of the items in shipment 4 from the example above are computed as follows:

$$\Delta_{pkg\_wt} = w_{pkg\_meas} - \bar{x}_{pkg\_wt} = 3.65 - 3.54 = .11$$

$$P_{book1}\bar{x}_{book1\_wt} + \Delta_{pkg\_wt} \cdot \frac{\bar{x}_{book1\_wt}}{\bar{x}_{pkg\_wt}}$$

$$1.2 + 0.11 \cdot \frac{1.2}{3.54} = 1.237$$

$$P_{book2} 1.8 + 0.11 \cdot \frac{1.8}{3.54} = 1.856$$

$$P_{DVD} = 0.3 + 0.11 \cdot \frac{0.3}{3.54} = 0.309$$

A current mean and sigma is recalculated as additional estimated item weight values are collected, such as in some embodiments to include up to some specified number (e.g., 100) of the most recent shipments containing those items. Standard formulas are used for the sample mean $\bar{x}_{p\_item}$ and sample sigma $\sigma_{p\_item}$ where N is the number of samples, as follows:

$$\bar{x}_{p\_item} = \frac{1}{N}\sum p_{iten}$$

$$\sigma_{p\_item} = \sqrt{\frac{\sum(p_{item} - \bar{x}_{p\_item})^2}{N-1}}$$

For the case when no weight information exists for one of the items in a package's contents, a weight estimate for this item can be computed based on the weight delta between the measured package weight and the anticipated weight of the remaining items in the package. For this case, the entire weight delta, without proportioning, is assigned as the derived weight for this item lacking weight information, as follows. Note that it is possible, under certain rare conditions, that some values collected for $p_{item\_without\_weight\_data}$ may be slightly negative when computed for multi-item packages. Negative means, zero sigma, and negative lower spec weights can be prevented from propagating into the stored item information, and filtering out a negative $p_{item\_without\_weight\_data}$ is also acceptable $$w_{pkg\_meas} - \bar{x}_{pkg\_wt} = \Delta_{pkg\_wt} = p_{item\_without\_weight\_data}$$

In this manner, a set of measurement-derived estimated item weight values for an item can be collected and stored, with mean and sigma weight data being computed for these weight values as each new weight value is stored. Prior to updating an item's information with adjusted item mean and sigma weight information, however, a few statistical validation checks can be conducted.

The first such check is to verify that $\bar{x}_{p\_item} > 0$ (i.e., that the curr_mean is greater than zero). If this is not the case, then the mean and sigma weight information stored for this item should not be adjusted, and an error could instead be logged indicating that a negative or zero mean weight has been encountered, since it does not make sense to populate an item database with negative or zero mean weights.

A second such check is to verify that $\sigma_{p\_item} > 0.0$, such as for a Kalman estimator that assumes a positive sigma or other statistical estimator approach. Due to tiny scale fluctuations, measurement repeatability, and other small perturbations, it is statistically consistent to force a positive value for $\sigma_{p\_item}$, if it is zero. An initial value of 0.01 is reasonable. Therefore, prior to using $\bar{x}_{p\_item}$ and $\sigma_{p\_item}$ in the Kalman estimator equations, if $\sigma_{p\_item}$ is zero, then set $\sigma_{p\_item} = 0.01$. In some embodiments, this may be a tunable parameter to avoid a pessimistic minimum sigma value from limiting performance.

A third such check is to verify that the stored weight values for a specific item are normally distributed, such as by using the Kolmogorov-Smirnov or Shapiro-Wilk test. If this test is significant then the distribution is not normal. This test is useful since it provides an indication that the set of item weight values may have a 'significant' weight shift/drift or contain a mix of weight modes (multi-modal). If this is the case, then the mean and sigma weight information for this item can still be adjusted, but a warning could be logged indicating that a significantly non-normal distribution in the weights has been encountered.

Once the statistical validation checks are completed successfully, the mean and sigma weight information can be adjusted. For this part, a minimum variance linear estimator, known as a Kalman estimator or Kalman filter, can be used to compute the updated mean and sigma weight values. Three equations completely describe the Kalman estimator in this example for the update step: Kalman gain, mean update, and sigma update. Note: The term $\sigma_{ftp}$, becomes a tuning parameter for most real-world Kalman estimator applications, and in some embodiments may initially be set to $\sigma_{ftp}$=0.015.

$$K = \frac{(\sigma^2_{IM\_old} + \sigma^2_{ftp})}{(\sigma^2_{IM\_old} + \sigma^2_{ftp} + \sigma^2_{P\_item})}$$

$$\bar{x}_{IM\_new} = (1-K) \cdot \bar{x}_{IM\_old} + K \cdot \bar{x}_{p\_item}$$

$$\sigma_{IM\_new} = \sqrt{(1-K) \cdot (\sigma^2_{IM\_old} + \sigma^2_{ftp})}$$

When some items are lacking weight data (mean and sigma) once the kick-out decisions begin, a fast-ramp phase-in strategy for those items can be implemented as follows:
- when the first estimated weight for an item is received, set the mean for the item to that weight and the sigma to be 20% of the weight, and allow these values to be used for subsequent kick-out decisions involving the item;
- when the second through fourth estimated weights for the item are received, compute a new mean based on the available estimated weights; and
- when the fifth weight for the item is received, compute a new mean and sigma, and double the sigma; and
- until the 25$^{th}$ weight is received, continue to compute new means, and once the 25$^{th}$ weight is received, generate an updated sigma using the Kalman estimator equations.

Those skilled in the art will also appreciate that in some embodiments the functionality provided by the routines discussed above may be provided in alternative ways, such as being split among more routines or consolidated into less routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A computer-implemented method for automatically identifying item packages with incongruous contents, the method comprising:
   identifying items intended to be contents of a target package that is sealed for shipment;
   automatically calculating an anticipated total weight for the sealed target package based at least in part on automatically estimated actual weights of the identified items, the automatically estimated actual weight of each of the identified items being based on measured weights of other packages that are sealed for shipment and that have contents that include the identified item, the automatic calculating of the anticipated total weight being performed by one or more programmed computing systems;
   weighing the sealed target package to determine an actual total weight for the sealed target package; and
   when a difference between the anticipated and actual total weights for the sealed target package exceeds a predetermined threshold, diverting the sealed target package from shipping to be opened to enable the contents of the sealed target package to be manually reviewed for accuracy.

2. The method of claim 1 further comprising, before the calculating of the anticipated total weight for the sealed target package, automatically estimating an actual weight of each of multiple items based on measured weights of one or more packages sealed for shipment whose contents include the items.

3. The method of claim 2 wherein the method is performed for each of multiple target packages sealed for shipment based on the estimated actual item weights of the multiple items in order to automatically detect problems with contents of the multiple target packages, and wherein a potential problem is automatically identified for a sealed target package if the difference between the anticipated and actual total weights for the sealed target package exceeds the predetermined threshold.

4. The method of claim 2 wherein the multiple items include the identified items intended to be the contents of the sealed target package.

5. The method of claim 1 further comprising updating the estimated actual weight for one or more of the items included in the target package based on information received from a manual review of the target package.

6. The method of claim 1 further comprising, after a manual review of the target package indicates that the contents of the target package are accurate, updating the estimated actual weight for one or more of the items included in the target package to correspond to the actual total weight for the package.

7. The method of claim 1 further comprising, after a manual review of the target package indicates that the contents of the target package are inaccurate, correcting the contents of the target package as part of the manual review before shipping the target package with the corrected contents.

8. The method of claim 1 wherein the calculating of the anticipated total weight for the sealed target package includes determining whether to perform the calculating based on whether estimated weights are available for each of the identified items included in the target package contents.

9. The method of claim 1 wherein the calculating of the anticipated total weight for the target package includes determining the predetermined threshold for use with the target package.

10. The method of claim 1 further comprising:
    automatically estimating values for one or more parameters of each of the identified items other than weight; and automatically determining whether there is a difference between one or more measured values for the one or more parameters of the target package and one or more estimated values for the one or more parameters of the target package, the one or more estimated values for the one or more parameters of the target package being based on the estimated values for the one or more parameters for the identified items.

11. The method of claim 10 wherein the one or more parameters include dimensions.

12. The method of claim 10 wherein the determining of whether there is a difference between the one or more measured values and the one or more estimated values for the one or more parameters of the target package includes identifying whether incongruities exist in packaging used for the target package.

13. The method of claim 1 wherein the identified items are distinct from each other such that the items can be shipped together in any combination.

14. The method of claim 1 wherein at least some of the other packages each contain multiple items of multiple distinct types.

15. The method of claim 1 further comprising, for each of one or more items other than the identified items, identifying an estimated actual weight of the item in a manner other than based on a measured weight of a package whose contents include the item, and further comprising calculating anticipated total weights for other sealed packages that include the other items based at least in part on the identified estimated actual weights of the other items.

16. A computer-readable medium whose contents include software instructions that when executed configure a computing device to automatically analyze packages, by performing a method comprising:
   automatically estimating values for one or more item parameters of items included in a set of packages based on measured values for corresponding parameters of the packages, the automatic estimating of the values being performed by the configured computing device;
   automatically determining for a target package whether measured actual values for one or more parameters of the target package differ from anticipated values for those target package parameters, the anticipated package parameter values being determined based at least in part on the estimated values for corresponding item parameters of items that are intended to be included in the target package, the automatic determining for the target package being performed by the configured computing device; and
   updating one or more of the estimated item parameter values for at least one of the items included in the target package so as to reflect the measured actual parameter values for the target package.

17. The computer-readable medium of claim 16 wherein the method further comprises, if it is automatically determined that a difference between the measured and anticipated actual values for the target package parameters exceeds a predetermined threshold, performing a manual review of the target package.

18. The computer-readable medium of claim 17 wherein the updating of the one or more estimated item parameter values for the at least one items included in the target package is performed after the manual review of the target package indicates that the target package does not have a problem.

19. The computer-readable medium of claim 16 wherein the item parameters include at least one of weight and dimensions.

20. The computer-readable medium of claim 16 wherein the target package parameters include at least one of weight and dimensions.

21. The computer-readable medium of claim 16 wherein the item parameters for which values are automatically estimated include item dimensions, wherein the corresponding package parameters are package dimensions, and wherein the anticipated package parameter values are package dimension parameter values of a package type that is mapped to the items that are intended to be included in the target package.

22. The computer-readable medium of claim 21 wherein the method further comprises generating mappings for groups of items to package types, and wherein the mapped package type for the target package is selected using the generated mappings.

23. The computer-readable medium of claim 22 wherein each generated mapping for a group of items to a package type is based at least in part on estimated values for the dimensions of at least some of the items in the group.

24. The computer-readable medium of claim 22 wherein the method further comprises, before the automatic determining for the target package of whether the measured actual values for the one or more parameters of the target package differ from the anticipated values for those target package parameters, providing indications of at least one mapped package type for each of at least one of the groups of items.

25. The computer-readable medium of claim 22 wherein the package types mapped to groups of items correspond to multiple predefined types of boxes, each predefined box type having distinct associated dimensions.

26. The computer-readable medium of claim 25 wherein the measured actual parameter values for the target package are obtained by retrieving associated dimensions for a predefined box type used for the target package.

27. The computer-readable medium of claim 26 wherein determining whether the measured actual parameter values for the target package differ from the anticipated parameter values for the target package includes determining that the indicated predefined box type for the target package differs from one or more package types mapped to the items that are intended to be included in the target package.

28. The computer-readable medium of claim 25 wherein determining whether the measured actual parameter values for the target package differ from the anticipated parameter values for the target package includes determining that the measured actual parameter values for the target package are less than the anticipated parameter values for the target package.

29. The computer-readable medium of claim 25 wherein the method further comprises, if the measured actual parameter values for the target package are larger than the anticipated parameter values for the target package, providing an indication that future packaging for the items intended to be included in the target package is to use a smaller predefined box type corresponding to the anticipated parameter values.

30. The computer-readable medium of claim 16 wherein the computer-readable medium is at least one of a memory of a computing device and a data transmission medium transmitting a generated data signal containing the contents.

31. The computer-readable medium of claim 16 wherein the contents of the computer-readable medium include one or more data structures for use in determining anticipated package parameter values based on estimated parameter values for items intended to be included in the contents of the package, the data structure comprising multiple entries that each correspond to an item, each entry including at least one estimated value for a parameter of the item and indicating multiple factors that affect that estimated value.

32. A computing system configured to automatically identify incongruous packages, comprising:
   one or more processors;
   an item weight determiner component that is configured to, when executed by at least one of the one or more processors, and for each of multiple items, automatically estimate a weight of the item based on measured weights of one or more packages whose contents include the item; and
   a package contents incongruity identifier component that is configured to, when executed by at least one of the one or more processors,
      identify items intended to be in contents of a package other than the one or more packages;
      calculate an anticipated total weight for the package if the identified intended items are in the package contents, the anticipated total weight being based at least in part on the estimated weights of the intended items;
      determine an actual total weight for the package; and
      identify the package for manual review based on a calculated mathematical difference between the anticipated and actual total weights for the package.

33. The computing system of claim 32 further comprising a manual feedback handler component that is configured to update one or more of the estimated item weights for at least one of the items included in the package contents so as to reflect the actual total weight for the package.

34. The computing system of claim 32 wherein the item weight determiner component and the package contents incongruity identifier component each include instructions for execution in memory of the computing system.

35. The computing system of claim 32 wherein the item weight determiner component consists of a means for, for each of multiple items, automatically estimating a weight of the item based on measured weights of one or more packages whose contents include the item, and wherein the package contents incongruity identifier component consists of a means for identifying items intended to be in contents of a package other than the one or more packages, calculating an anticipated total weight for the package if the identified intended items are in the package contents, the calculating being based at least in part on the estimated weights of the intended items, determining an actual total weight for the package, and identifying the package for manual review based on a difference between the anticipated and actual total weights for the package.

36. A computer-implemented method for automatically identifying incongruities for item packages, the method comprising:
   identifying items intended to be in contents of a sealed target package;
   automatically determining an anticipated parameter value for the target package if the identified items are in the target package contents based at least in part on estimated parameter values of the identified items, the automatic determining of the anticipated parameter value being performed by one or more programmed computing systems;
   determining an actual parameter value for the target package; and
   when a difference between the anticipated and actual parameter values for the target package exceeds a predetermined threshold, identifying the target package for manual inspection based on a possible problem with the target package corresponding to the exceeding of the predetermined threshold.

37. The method of claim 36 wherein the parameter value for the target package is a size of the target package.

38. The method of claim 37 wherein the method is performed for each of multiple sealed packages that each contain one or more items.

39. The method of claim 36 wherein the parameter value for the target package is a weight of the target package.

40. The method of claim 36 wherein the difference between the anticipated and actual parameter values for the target package exceeding the predetermined threshold reflects that items actually included in the contents of the target package are different from the items intended to be included in the contents of the target package.

41. The method of claim 36 further comprising automatically estimating an actual parameter value for each of multiple items based on determined actual parameter values of one or more packages sealed for shipment whose contents include that item, and wherein determining the anticipated parameter value for the target package is based at least in part on the automatically estimated actual parameter values of the items identified to be in the contents of the target package.

42. The method of claim 36 wherein the parameter value for the target package is a size of the target package, and wherein determining the anticipated size for the target package includes retrieving an indicated size for a type of package that is mapped to the identified items intended to be in the contents of the target package.

43. The method of claim 42 further comprising generating mappings for one or more groups of items to one or more appropriate package types for the groups.

44. The method of claim 43 wherein each generated mapping for a group of items to one or more appropriate package types is based at least in part on values estimated for dimensions of the one or more items, the estimated dimension values for the one or more items being based on dimensions of prior sealed packages that contain those items.

45. The method of claim 43 further comprising providing indications of at least one mapped appropriate package type for each of at least one of the groups of items.

46. The method of claim 43 wherein the appropriate package types mapped to groups of items are each one of multiple predefined types of boxes, each predefined box type having distinct associated dimensions.

47. The method of claim 46 wherein determining the actual size for the target package includes obtaining an indication of a predefined box type used for the target package and retrieving at least one of the associated dimensions for that predefined box type.

48. The method of claim 47 wherein a determination of whether the difference between the anticipated and actual sizes for the target package exceeds the predetermined threshold includes determining that the indicated predefined box type for the target package differs from a package type that is mapped to the items that are intended to be in the contents of the target package.

49. The method of claim 46 wherein the determination of whether the difference between the anticipated and actual sizes for the target package exceeds the predetermined threshold includes determining that the actual size for the target package is smaller than the anticipated size for the target package.

50. The method of claim 46 further comprising, if the actual size for the target package is larger than the anticipated size for the target package, providing an indication that future packaging will use a predefined box type with a smaller size corresponding to the anticipated size.

51. The method of claim 36 wherein, if the manual inspection of the target package indicates that the target package does not have a problem, updating information used to determine the anticipated parameter value for the target package so as to reflect the determined actual parameter value for the target package.

52. The method of claim 36 wherein determining the anticipated parameter value for the target package is based at least in part on information about sizes of the items identified to be in the contents of the target package.

53. A computer-implemented method for automatically identifying incongruous item packages, the method comprising:

for each of multiple items, automatically obtaining an estimated actual weight of the item that is based on measured weights of one or more packages whose contents include the item, the automatic obtaining being performed by one or more programmed computing systems;

calculating an anticipated total weight for a target package based on the estimated actual weights of items intended to be in the target package; and if a difference between the anticipated total weight for the target package and an actual total weight for the target package exceeds a threshold, diverting the target package from shipping for additional handling; and if it is determined that a problem does not exist with the contents of the diverted target package, automatically modifying information used for the calculating of the anticipated total weight for the target package to reflect the actual total weight for the target package.

54. The method of claim 53 wherein the modifying of the information used for the calculating of the anticipated total weight for the target package includes modifying the estimated actual weights for at least one of the items included in the target package to improve accuracy.

55. The method of claim 53 further comprising updating the estimated actual weight for one or more of the items included in the target package based on information received from a manual review of the target package.

56. The method of claim 53 wherein the difference between the anticipated total weight for the target package and the actual total weight for the target package does not exceed the threshold, and wherein the method further comprises, if received information indicates existence of a problem with contents of the target package, modifying information used for the calculating of the anticipated total weight for the target package such that after the modifying a new calculated anticipated total weight for the target package would differ sufficiently from the actual total weight for the target package to exceed the threshold.

57. The method of claim 53 wherein the difference between the anticipated total weight for the target package and the actual total weight for the target package does not exceed the threshold, and wherein the method further comprises, if received information indicates existence of a problem with contents of the target package, modifying information used to determine whether the difference in the actual and anticipated total weights exceeds the threshold such that after the modifying a calculated anticipated total weight for the target package would differ sufficiently from the actual total weight for the target package to exceed a selected threshold.

58. The method of claim 53 wherein the automatic modifying of the information used for the calculating of the anticipated total weight for the target package is performed in a real-time manner.

59. A computer-implemented method for automatically identifying incongruous item packages, the method comprising:

automatically estimating an actual weight of each of one or more items based on measured weights of one or more packages whose contents include the one or more items, the automatic estimating being performed by one or more programmed computing systems;

calculating an anticipated total weight for a target package based on the estimated actual weights of items intended to be in the target package; and if a difference between the anticipated total weight for the target package and an actual total weight for the target package exceeds a limit, providing an indication of a measurement device from which the actual total weight for the target package was obtained, the indicated measurement device determined to have a possible problem based at least in part on the exceeding of the limit.

60. The method of claim 59 further comprising automatically detecting a problem with the measurement device based on an analysis of actual total weights obtained from the measurement device.

61. The method of claim 60 wherein the automatic detecting of the problem with the measurement device includes comparing actual total weights for packages from that measurement device to actual total weights for packages from other measurement devices.

62. The method of claim 60 wherein the automatic detecting of the problem with the measurement device is based at least in part on one or more occurrences of incorrectly identifying potential problems for packages based on actual total weights for those packages from the measurement device.

63. The method of claim 60 wherein the automatic detecting of the problem with the measurement device is performed in a real-time manner.

64. The method of claim 59 further comprising, if the difference between the anticipated total weight for the target package and the actual total weight for the target package exceeds the limit, dynamically causing the measurement device from which the actual total weight for the target package was obtained to not be used for providing actual total weights for other packages.

* * * * *